(12) United States Patent
Xu et al.

(10) Patent No.: US 11,280,762 B2
(45) Date of Patent: Mar. 22, 2022

(54) ACOUSTIC EMISSION TEST EQUIPMENT AND ANALYSIS TECHNOLOGY FOR ROCK BREAKING

(71) Applicants: Sichuan University, Chengdu (CN); Chengdu University, Chengdu (CN)

(72) Inventors: Huining Xu, Chengdu (CN); Jianfeng Liu, Chengdu (CN); Yan Wan, Chengdu (CN); Jianliang Pei, Chengdu (CN); Lu Wang, Chengdu (CN); Chunping Wang, Chengdu (CN); Qiangxing Zhang, Chengdu (CN)

(73) Assignees: SICHUAN UNIVERSITY, Chengdu (CN); CHENGDU UNIVERSITY, Chengdu (CN)

( * ) Notice: Subject to any disclaimer, the term of this patent is extended or adjusted under 35 U.S.C. 154(b) by 240 days.

(21) Appl. No.: 16/699,130

(22) Filed: Nov. 29, 2019

(65) Prior Publication Data
US 2020/0232950 A1  Jul. 23, 2020

(30) Foreign Application Priority Data
Nov. 29, 2018 (CN) .......................... 201811447461.8

(51) Int. Cl.
*G01N 29/14* (2006.01)
*G01N 29/22* (2006.01)

(52) U.S. Cl.
CPC .......... *G01N 29/14* (2013.01); *G01N 29/223* (2013.01); *G01N 2203/0423* (2013.01); *G01N 2291/0232* (2013.01)

(58) Field of Classification Search
CPC ...... G01N 29/14; G01N 29/223; G01N 29/11; G01N 29/227; G01N 29/228; G01N 29/48; G01N 2203/0423; G01N 2203/0017; G01N 2203/0048; G01N 2203/0226; G01N 2203/0658; G01N 2203/0232; G01N 2291/0232; G01N 3/08; G01N 3/06
See application file for complete search history.

(56) References Cited

U.S. PATENT DOCUMENTS

| 6,213,958 B1 * | 4/2001 | Winder | A61B 5/6843 |
| | | | 600/442 |
| 2006/0079773 A1 * | 4/2006 | Mourad | A61B 8/00 |
| | | | 600/438 |

* cited by examiner

*Primary Examiner* — Suman K Nath
(74) *Attorney, Agent, or Firm* — Bayramoglu Law Offices LLC

(57) ABSTRACT

A system for monitoring rock damage in deep engineering environment includes an acoustic emission sensor assembly and an acoustic emission amplifier assembly. The assemblies are mounted on a rock mechanics test system. The acoustic emission sensor clamp includes a coupling screw, as well as a clamp cover, a clamp cylinder, and a coupling panel threadedly connected in sequence. The acoustic emission amplifier assembly includes an acoustic emission amplifier, an upright column having a guide rail, a lifting support plate, and a support plate lifting oil cylinder. Additionally, an evaluation method based on acoustic emission tempo-spatial evolution laws is presented. According to the properties of acoustic emission, fractal characteristics of damage evolution processes of rock test pieces are analyzed and the relationship between stress, energy and fractal dimension in the whole process of tensile deformation damage of the rock test pieces is obtained.

13 Claims, 14 Drawing Sheets

ACOUSTIC EMISSION TEST EQUIPMENT AND ANALYSIS TECHNOLOGY FOR ROCK BREAKING

CROSS REFERENCE TO THE RELATED APPLICATIONS

This application is based upon and claims priority to Chinese Patent Application No. 201811447461.8, filed on Nov. 29, 2018, the entire contents of which are incorporated herein by reference.

TECHNICAL FIELD

The present invention relates to the field of real-time monitoring of rock damage and breakage under high temperature and high pressure, and more particularly, to a system for monitoring rock damage in a deep engineering environment and an evaluation method based on acoustic emission tempo-spatial evolution laws.

BACKGROUND

In order to research the mechanical properties of rocks in deep environments, high temperature and high confining pressure triaxial tests are needed. Moreover, in the test processes, to determine associated energy parameters involved, acoustic emission coupling needs to be frequently performed on the rock damage process.

At present, there are no fixing devices having good stable contact and easy translocation for existing acoustic emission test sensors used in coupled acoustic emission detection tests. As a result, existing acoustic emission test sensors have the following defects.

A. Existing acoustic emission sensors do not have a reasonably designed fixing sleeve. Arc-shaped outer walls of triaxial cavities, for example, cannot maintain a full, linear and stable contact with the sensors, which interferes with stable and continuous electric signal reception. This may easily lead to failure of a system for monitoring rock damage in deep engineering environments.

B. Devices for fixing acoustic emission sensors, such as adhesive bonding, tape wrapping, or rubber bands, have several shortcomings. In one aspect, the sensors may move as test devices are lifted and lowered in the test process, which may cause a change in acoustic emission signal locating points, thereby causing initial locating conditions of each test to be different. In another aspect, in the test process, the acoustic emission sensors may be separated from or even fall off the triaxial testing devices, thereby resulting in separation of the system for monitoring rock damage in deep engineering environment from signal sources and interruption of acoustic emission data transmission, which may have a negative effect on the continuity and accuracy of the test results. In addition, adhesives are not optimal for translocation, and the sensors and circuits may be easily damaged in disassembly and repair processes. Therefore, excess hours of manpower and substantial financial resources are wasted as sensors are needed to be overhauled.

Furthermore, acoustic emission amplifiers connected to the acoustic emission sensors in the existing test systems are generally placed on rear platforms of the existing test systems or tied to upright columns on two sides of the test systems, which has the following defects.

C. Bending or kinking of the signal lines may occur and negatively impact the transmission effect of the electric signals, resulting in poor detection.

D. The acoustic emission amplifiers contact the triaxial cavities of the test systems. Under high-temperature test conditions, the signals transmitted by the acoustic emission amplifiers are disordered, such that reasonable and effective scientific test data cannot be obtained.

E. In test batch samples, the change of the to-be-tested samples may cause transmission line connection interfaces to be disturbed. This means that the line stability in the test process is not in a steady state and thus causes a significant systemic error to the test, thereby having a negative effect on the accuracy of the test results.

Therefore, in order to ensure the accuracy, continuity, and stability of the test data, it is necessary to equip a rock test machine for researching mechanical properties of rocks with a dedicated system for monitoring rock damage in deep engineering environment. This system has to be able to guarantee the accuracy and stability of signal in an acoustic emission test process under high temperature and high pressure conditions.

Additionally, acoustic emission phenomena may occur when a material or structure is deformed or fractured due to an external load or internal force. There are various source mechanisms that may induce the acoustic emission. For example, the formation and expansion of micro-defects inside the material, plastic deformation, and dislocations inside the material may cause the acoustic emission phenomena. Although there are various mechanisms promoting the acoustic emission phenomena, the most fundamental reasons for forming acoustic emission are the same. That is, a localised change occurs inside the material while releasing energy concurrently as external conditions such as stress, temperature and magnetic fields change. As long as the initiation and expansion of micro-defects occur inside the material, acoustic emission may be produced. In other words, when the material undergoes permanent deformation and generates permanent damage, the acoustic emission phenomena may occur inside the material. Therefore, it is an extremely effective method to study the damage evolution in the process of material deformation and damage based on acoustic emission.

The damage process of rock under loads is a process including damage formation, damage development and damage accumulation. With the continuous formation, aggregation and expansion of damage, the formed, aggregated and interconnected micro-cracks are gradually transformed to a macro-crack surface, as a result, elastic energy inside rock is gradually released. The gradual formation, aggregation and expansion of damage urge the elastic energy inside rock to be continuously released, thereby forming acoustic emission (AE) signals that can be detected by test sensors. The frequency and location of the AE signals reflect the density and spatial distribution of the damage inside the rock. These parameters can be displayed on computer screens in real time by a three-dimensional acoustic emission location system (AE location system).

However, in the existing research, there is no technical means capable of obtaining the correlational relationship between stress, energy and fractal dimension in the process of deformation of test pieces.

SUMMARY

An objective of the present invention is to provide a system for monitoring rock damage in a deep engineering environment, so as to solve the problem of acoustic emission signal interference and signal inaccuracy due to triaxial high temperature and high confining pressure in the rock breaking test process under high temperature and high pressure.

Another objective of the present invention is to provide an evaluation method based on acoustic emission tempo-spatial evolution laws. According to the properties of acoustic emission, fractal characteristics of damage evolution processes of rock test pieces are analyzed, and finally the relationship between stress, energy and fractal dimension in the whole process of tensile deformation of the rock test pieces is obtained.

The present invention is implemented by the following technical solution. A system for monitoring rock damage in a deep engineering environment includes an acoustic emission sensor assembly and an acoustic emission amplifier assembly that are mounted on a rock mechanics test system. The rock mechanics test system includes a triaxial cavity base, a triaxial cavity mounted on the triaxial cavity base, a triaxial cavity lifting oil cylinder mounted on the top of the triaxial cavity, an upright column mounted on the output end of the triaxial cavity lifting oil cylinder, and a test piece indenter and an indenter base correspondingly arranged at the top and bottom in the triaxial cavity. Between the test piece indenter and the indenter base there is space for placing a test piece. The test piece indenter is mounted on the output end of the triaxial cavity lifting oil cylinder through the upright column, and the triaxial cavity lifting oil cylinder drives the test piece indenter through the upright column to move up and down.

The acoustic emission sensor assembly includes a plurality of acoustic emission detection heads and a clamp fixing spring. Each acoustic emission detection head includes a respective acoustic emission sensor and a corresponding acoustic emission sensor clamp.

The acoustic emission sensor clamp includes a coupling screw, as well as a clamp cover, a clamp cylinder, and a coupling panel which are threadedly connected in sequence. The clamp cover includes a cover body provided with internal threads. A cover spring installed at the center of the bottom surface of the inner cavity of the cover body. Two ends of the cylinder wall of the clamp cylinder are provided with external threads. An end of the cylinder wall is provided with an arc-shaped notch. Three cut-through coupling holes are evenly distributed on the cylinder wall along a circumferential direction, and three coupling screws pass through the three coupling holes respectively to clamp the acoustic emission sensor radially onto the clamp cylinder at the center of the inner cavity of the clamp cylinder. The upper surface of the coupling panel is flat and straight and is provided with a threaded through hole at the center of the upper surface. The lower surface of the coupling panel is bent along a uniaxial direction and forms a cambered surface fitting with the outer surface of the cylinder wall of the clamp cylinder.

The triaxial cavity is further provided with two sets of acoustic emission detection heads in positional correspondence with two ends of the test piece, wherein one set of acoustic emission detection heads is composed of N acoustic emission detection heads uniformly distributed on the outer wall of the triaxial cavity along a circumferential direction and the clamp fixing spring connecting the N acoustic emission detection heads end to end to form a ring. Two ends of the acoustic emission sensor are respectively connected to the clamp fixing spring extending into the acoustic emission detection heads from the arc-shaped notch. The clamp fixing spring in a stretched state provides the acoustic emission sensor with a pressure urging the acoustic emission detection head to stably fit with the outer wall of the triaxial cavity, wherein N is a positive integer greater than 1.

The acoustic emission amplifier assembly includes an acoustic emission amplifier, an upright column having a guide rail, a lifting support plate, and a support plate lifting oil cylinder. The output end of the support plate lifting oil cylinder mounted on the triaxial cavity base is connected to the lifting support plate arranged transversely. Two upright columns having guide rails vertically fixed to the triaxial cavity base are slidably connected to two ends of the lifting support plate, respectively. The acoustic emission amplifiers connected to the acoustic emission sensors in one-to-one correspondence are mounted on the lifting support plate far away from the triaxial cavity, and the acoustic emission amplifier sends an amplified signal to the acoustic emission sensor via a signal line passing through the arc-shaped notch.

The present invention is focused on providing a dedicated fixing device for each of the acoustic emission sensor and the acoustic emission amplifier. The invention not only ensures that the acoustic emission sensor can linearly and stably contact the triaxial cavity in the test process, but also avoids any damage to equipment when it is needed to adjust the installation position of the acoustic emission sensor or disassemble the acoustic emission sensor. Furthermore, the invention ensures that the acoustic emission amplifier is apart from the triaxial cavity without signal interference when the acoustic emission amplifier and the acoustic emission sensor are connected in accordance with the invention. The acoustic emission sensor assembly which can flexibly and stably fit the acoustic emission sensor with a designated position on the outer wall of the triaxial cavity and the acoustic emission amplifier assembly configured to mount the acoustic emission amplifier away from the triaxial cavity are used, as a result, accurate acoustic emission signal and strong anti-interference performance are achieved for the rock mechanics test system under high temperature and high pressure.

In one aspect of the invention, the clamp cylinder includes an outer metal cylinder, an inner heat insulation cylinder, and a condenser pipe. Between the outer metal cylinder and the inner heat insulation cylinder coaxially sleeved there is formed a condensation cavity communicating with the condenser pipe and allowing condensate to be introduced.

In another aspect, a groove is respectively arranged at edges near the left and right sides on the upper surface of the coupling panel, and two small-diameter circular holes are provided outside the groove.

In another aspect, two ends of the acoustic emission sensor are respectively provided with a small hole allowing the connector of the clamp fixing spring to pass through. Two adjacent acoustic emission sensors are directly connected through one clamp fixing spring, or two adjacent acoustic emission sensors are connected through a plurality of clamp fixing springs connected in series.

To better implement the present invention, further, the upper end of the upright column having the guide rail is provided with a linear guide rail, and two ends of the lifting support plate are respectively provided with a pulley embedded into the linear guide rail and linearly slidable along the linear guide rail.

In still another aspect of the invention, a value of the N is 4, there are eight total acoustic emission detection heads in two sets, and eight acoustic emission sensors of the eight acoustic emission detection heads are separately connected to eight acoustic emission amplifiers in one-to-one correspondence.

The present invention is implemented by the following technical solution. According to an evaluation method based on acoustic emission tempo-spatial evolution laws, a rock mechanics test system mounted with a system for monitoring rock damage in a deep engineering environment is employed to analyze an AE fractal characteristic of an acoustic emission tempo-spatial evolution process in a whole process of tensile deformation of salt rock. A fractal dimension of acoustic emission spatial distribution is calculated using a column covering method to obtain an AE characteristic relationship curve associated with an acoustic emission locating point. Finally, a relationship between stress, energy and fractal dimension of salt rock in different tensile conditions is analyzed based on energy variation in the whole process of the tensile deformation.

In another aspect of the invention, the AE characteristic relationship curve includes a curve of relationship between stress, ring count and time; a curve of relationship between stress, accumulated ring count and time; a curve of relationship between stress, energy rate and time; and a curve of relationship between stress, accumulated energy and time.

In another aspect of the invention, the different tensile conditions refer to three-point bending tension, indirect tension, direct tension, and alternating tension and compression.

Compared with the prior art, the present invention has the following advantages.

(1) The system for monitoring rock damage in the deep engineering environment disclosed by the present invention solves the problem of acoustic emission signal interference and signal inaccuracy due to triaxial high temperature and high confining pressure in the rock breaking test process under high temperature and high pressure.

(2) According to the evaluation method based on acoustic emission tempo-spatial evolution laws of the present invention, based on the properties of acoustic emission, fractal characteristics of damage evolution processes of rock test pieces are analyzed, and finally the relationship between stress, energy and fractal dimension in the whole process of tensile deformation of the rock test pieces is obtained.

Figure 1:
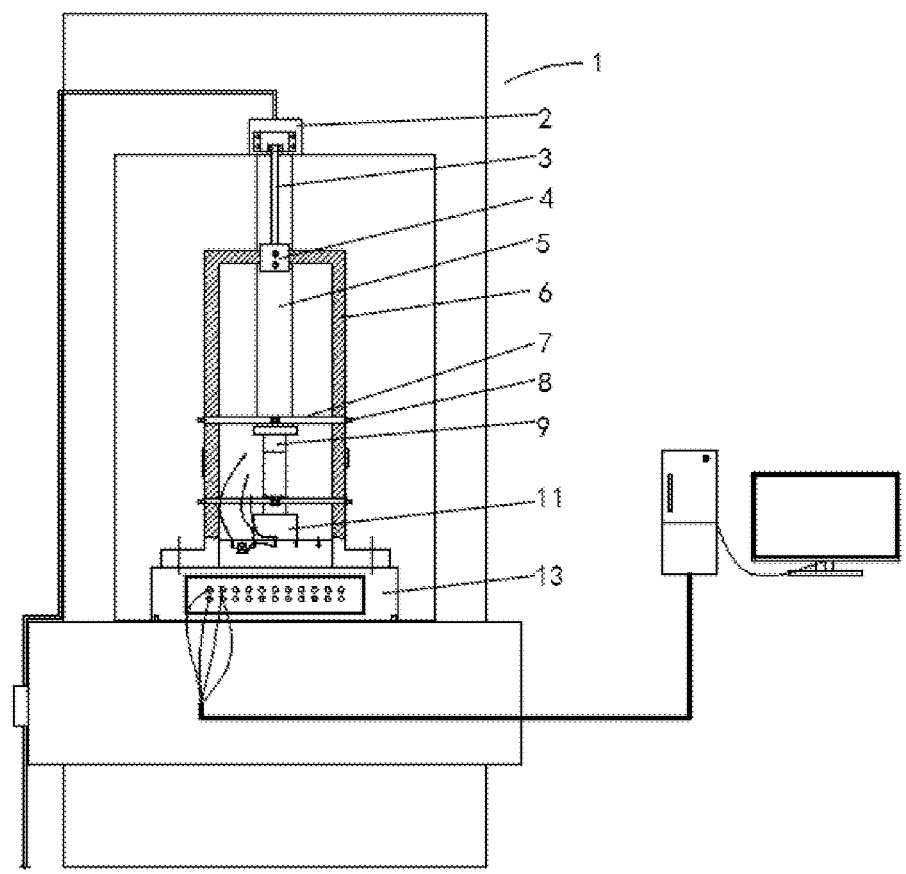
FIG. 1 is a front view of the system for monitoring rock damage in the deep engineering environment mounted on the rock mechanics test system according to the present invention.
Figure 2:
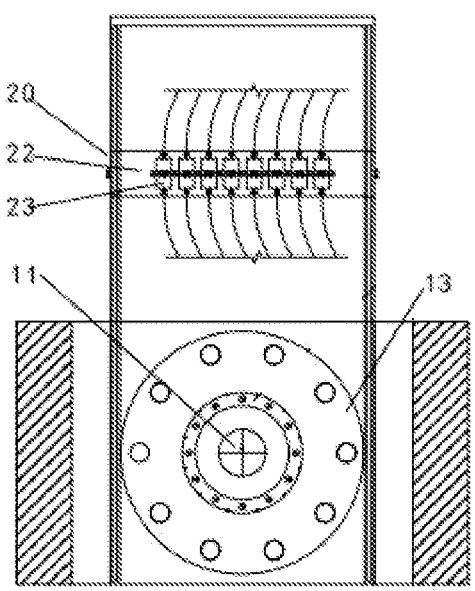
FIG. 2 is a top view of the system for monitoring rock damage in the deep engineering environment mounted on the rock mechanics test system according to the present invention.
Figure 3:
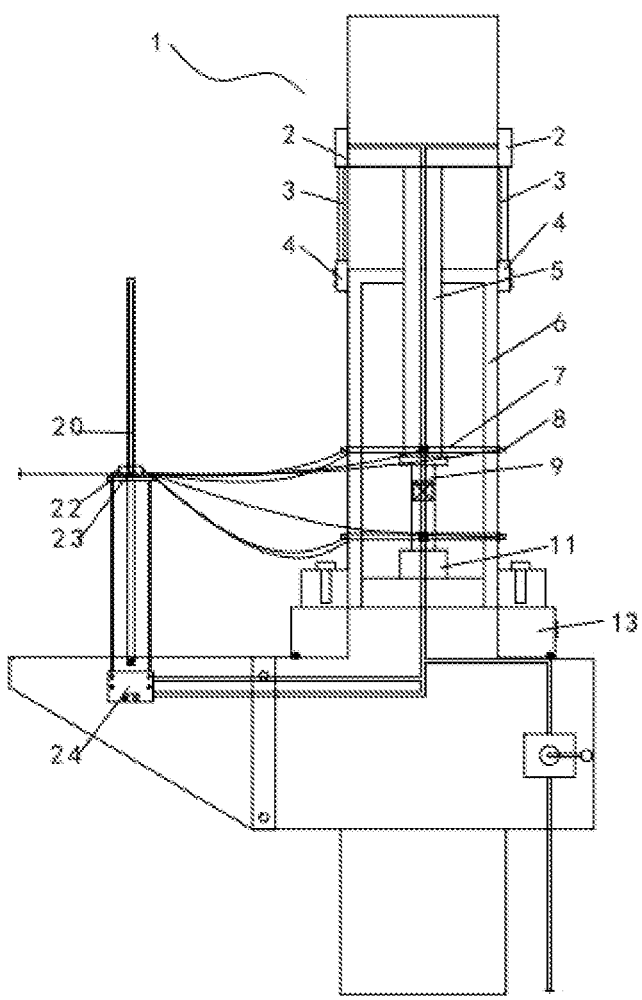
FIG. 3 is a left view of the system for monitoring rock damage in the deep engineering environment mounted on the rock mechanics test system according to the present invention.
Figure 4:
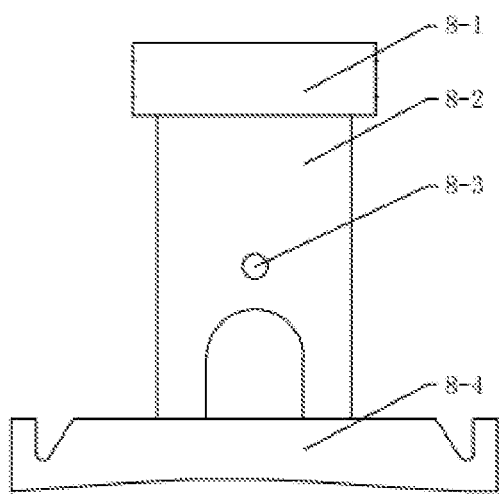
FIG. 4 is a schematic diagram showing the overall structure of the acoustic emission sensor clamp.
Figure 5:
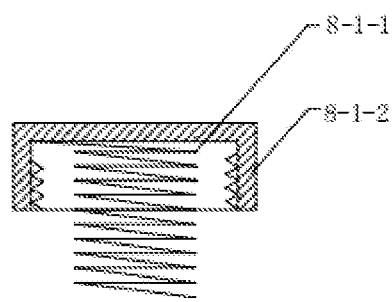
FIG. 5 is a schematic diagram showing the sectional structure of the clamp cover.
Figure 6:
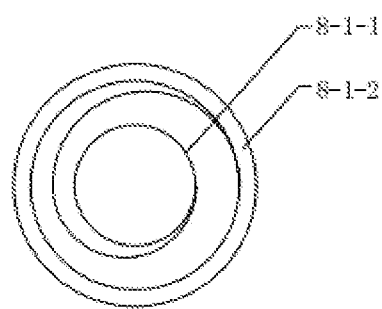
FIG. 6 is a bottom view of the clamp cover.
Figure 7:
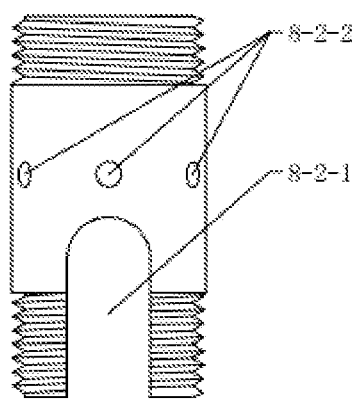
FIG. 7 is a schematic structural diagram of the clamp cylinder.
Figure 8:
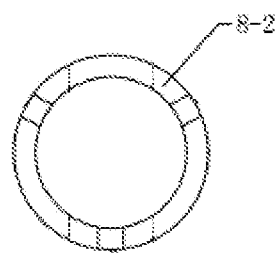
FIG. 8 is a cross-sectional view showing the structure through a common plane of an axis of a coupling hole.
Figure 9:
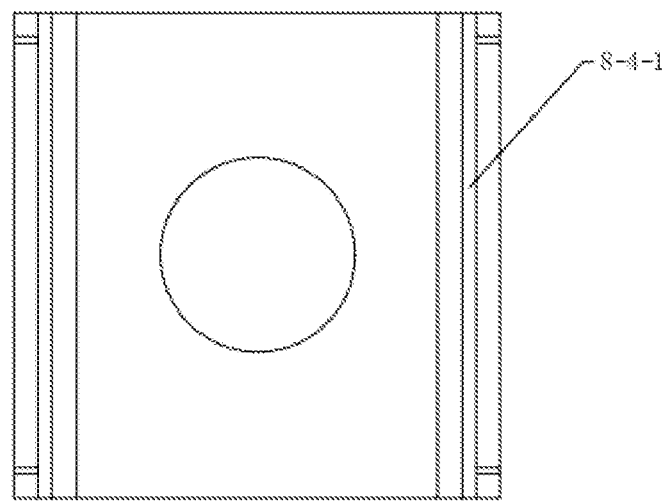
FIG. 9 is a top view of the coupling panel.
Figure 10:
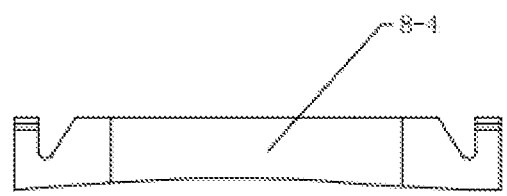
FIG. 10 is a front view of the coupling panel.
Figure 11:
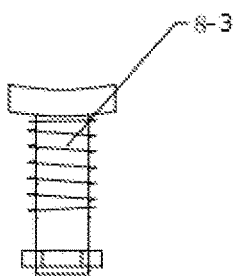
FIG. 11 is a schematic structural diagram of the coupling screw.
Figure 12:
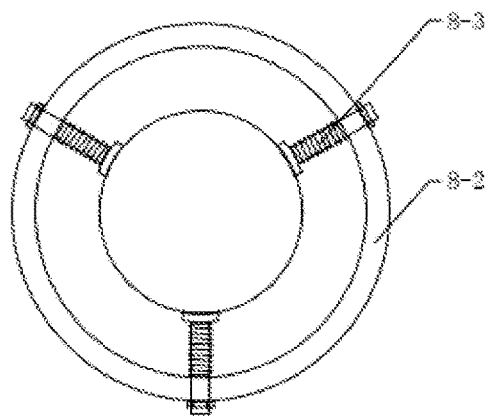
FIG. 12 is a schematic diagram showing that the coupling screws are mounted on the clamp cylinder to clamp a test piece.
Figure 13:
FIG. 13 is a schematic structural diagram of the clamp fixing spring.
Figure 14:
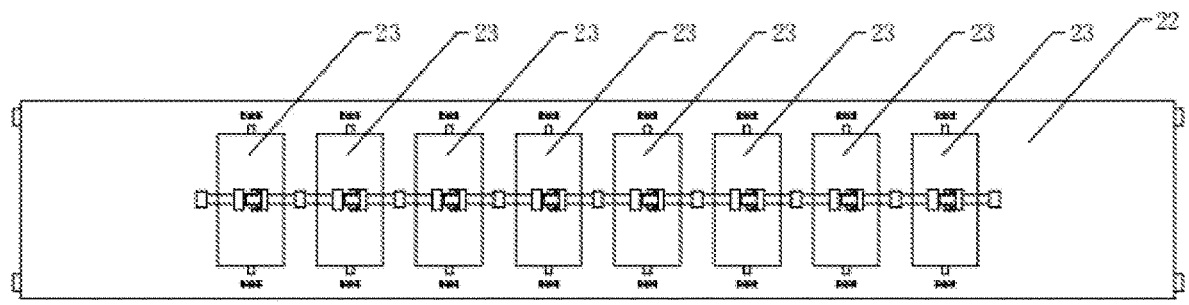
FIG. 14 is a schematic structural diagram of the lifting support plate.
Figure 15:
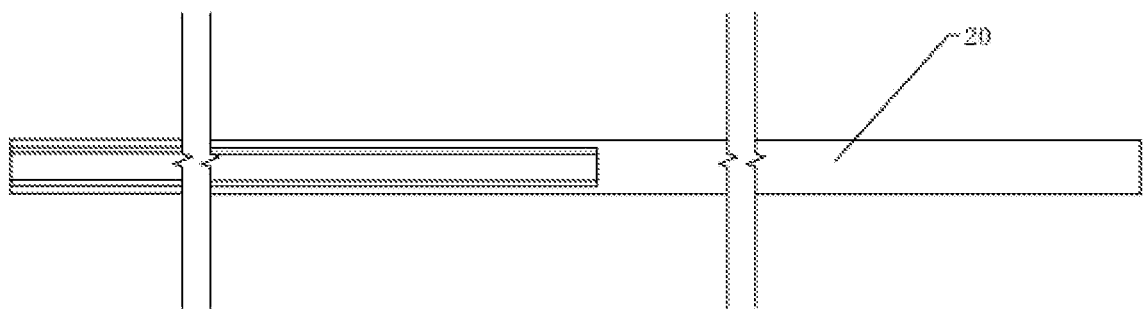
FIG. 15 is a front view of the upright column having the guide rail.
Figure 16:
FIG. 16 is a left view of the upright column having the guide rail.

In the drawings: rock mechanics test system 1; triaxial cavity lifting oil cylinder 2; lifting rod 3; lower lifting end 4; upright column 5; triaxial cavity 6; clamp fixing spring 7; acoustic emission sensor clamp 8; test piece indenter 9; indenter base 11; triaxial cavity base 13; upright column 20 having a guide rail; lifting support plate 22; acoustic emission amplifier 23; support plate lifting oil cylinder 24; clamp cover 8-1; cover spring 8-1-1; cover body 8-1-2; clamp cylinder 8-2; arc-shaped notch 8-2-1; coupling hole 8-2-2; coupling screws 8-3; coupling panel 8-4; groove 8-4-1.

DETAILED DESCRIPTION OF THE EMBODIMENTS

Embodiment 1

As shown in FIG. 1 to FIG. 16, an embodiment of a system for monitoring rock damage in a deep engineering environment is provided. The system includes an acoustic emission sensor assembly and an acoustic emission amplifier assembly that are mounted on the rock mechanics test system 1. The rock mechanics test system 1 includes the triaxial cavity base 13, the triaxial cavity 6 mounted on the triaxial cavity base 13, the triaxial cavity lifting oil cylinder 2 mounted on the top of the triaxial cavity 6, the upright column 5 mounted on the output end of the triaxial cavity lifting oil cylinder 2, and the test piece indenter 9 and the indenter base 11 correspondingly arranged at the top and bottom in the triaxial cavity 6. Between the test piece indenter 9 and the indenter base 11 there is space for placing a test piece, the test piece indenter 9 is mounted on the output end of the triaxial cavity lifting oil cylinder 2 through the upright column 5, and the triaxial cavity lifting oil cylinder 2 drives the test piece indenter 9 through the upright column 5 to move up and down.

The acoustic emission sensor assembly includes a plurality of acoustic emission detection heads and the clamp fixing spring 7. Each of the acoustic emission detection heads includes a respective acoustic emission sensor and the corresponding acoustic emission sensor clamp 8.

As shown in FIG. 4 to FIG. 12, the acoustic emission sensor clamp 8 includes the coupling screw 8-3, as well as the clamp cover 8-1, the clamp cylinder 8-2, and the coupling panel 8-4, which are threadedly connected in sequence. The clamp cover 8-1 includes the cover body 8-1-2 provided with internal threads, and the cover spring 8-1-1 installed at the center of the bottom surface of the inner cavity of the cover body 8-1-2. Two ends of the cylinder wall of the clamp cylinder 8-2 are respectively provided with an external thread, an end of the cylinder wall is provided with the arc-shaped notch 8-2-1. Three cut-through coupling holes 8-2-2 are evenly distributed circumferentially on the cylinder wall. Three coupling screws 8-3 pass through the three coupling holes 8-2-2 respectively to clamp the acoustic emission sensor radially onto the clamp cylinder 8-2 at the center of the inner cavity of the clamp cylinder 8-2. The upper surface of the coupling panel 8-4 is flat and straight and is provided with a threaded through hole at the center of the upper surface, and the lower surface of the coupling panel 8-4 is bent along a uniaxial direction and forms a cambered surface fitting with the outer surface of the cylinder wall of the clamp cylinder 8-2.

The triaxial cavity 6 is further provided with two sets of acoustic emission detection heads in positional correspondence with two ends of the test piece, wherein one set of acoustic emission detection heads is composed of N acoustic emission detection heads uniformly distributed circumferentially on the outer wall of the triaxial cavity 6 and the clamp fixing spring 7 connecting the N acoustic emission detection heads end to end to form a ring. Two ends of the acoustic emission sensor are respectively connected to the clamp fixing spring 7 extending into the acoustic emission detection heads from the arc-shaped notch 8-2-1. The clamp fixing spring 7 in a stretched state provides the acoustic emission sensor with a pressure urging the acoustic emission detection head to stably fit with the outer wall of the triaxial cavity 6, wherein N is a positive integer greater than 1.

Typically, the value of N is 2, 3, 4 or 8. For example, if the value of N is 4, there are eight total acoustic emission detection heads in two sets, and eight acoustic emission sensors of the eight acoustic emission detection heads are correspondingly connected to eight respective acoustic emission amplifiers 23.

As shown in FIG. 13 to FIG. 16, the acoustic emission amplifier assembly includes the acoustic emission amplifier 23, the upright column 20 having a guide rail, the lifting support plate 22, and the support plate lifting oil cylinder 24. The output end of the support plate lifting oil cylinder 24 mounted on the triaxial cavity base 13 is connected to the lifting support plate 22 arranged transversely. Two upright columns 20 having guide rails vertically fixed to the triaxial cavity base 13 are slidably connected, respectively, to two ends of the lifting support plate 22. The acoustic emission amplifiers 23 connected to the acoustic emission sensors in one-to-one correspondence are mounted on the lifting support plate 22 far away from the triaxial cavity 6, and the acoustic emission amplifier 23 sends an amplified signal to the acoustic emission sensor via a signal line passing through the arc-shaped notch 8-2-1.

In this embodiment, the acoustic emission sensor assembly substantially includes an acoustic emission sensor and the acoustic emission sensor clamp 8 configured to mount the acoustic emission sensor. The acoustic emission sensor and the acoustic emission sensor clamp 8 are arranged in one-to-one correspondence. The acoustic emission sensor clamp 8 includes the coupling screw 8-3, as well as the clamp cover 8-1, the clamp cylinder 8-2, and the coupling panel 8-4 which are threadedly connected in sequence. The clamp cover 8-1, the clamp cylinder 8-2, and the coupling panel 8-4 are threadedly connected in sequence to form an overall body, such that an overall and effective clamp device is formed. In another aspect, N acoustic emission sensors are connected by the clamp fixing spring 7 passing through the acoustic emission sensor clamp 8, and the N acoustic emission sensors are connected in series to form a set of ring-shaped acoustic emission detection heads biased toward the center by the spring in a stretched state. The acoustic emission sensor is thus urged to stably press against the outer wall of the triaxial cavity 6 using a centripetal component force formed on the acoustic emission sensor by the elastic force of the clamp fixing spring 7, to ensure a good and stable contact between the acoustic emission sensor and the triaxial cavity 6. Furthermore, the elastic force of the clamp fixing spring 7 may be restorable, the device is not to be damaged and is convenient to be assembled or disassembled when the acoustic emission sensor assembly needs to be moved or removed for repair.

The present invention is focused on providing a dedicated fixing device for each of the acoustic emission sensor and the acoustic emission amplifier 23, which not only ensures that the acoustic emission sensor can linearly and stably contact the triaxial cavity 6 in the test process, but also avoids any damage to equipment while adjusting the installation position of the acoustic emission sensor or disassembling the same. The invention further provides that the acoustic emission amplifier 23 is apart from the triaxial cavity 6 without signal interference when the acoustic emission amplifier 23 and the acoustic emission sensor are connected accordingly. That is, according to the present invention, by using the acoustic emission sensor assembly that flexibly and stably fits the acoustic emission sensor with a designated position on the outer wall of the triaxial cavity 6 and the acoustic emission amplifier assembly configured to mount the acoustic emission amplifier 23 away from the triaxial cavity 6, accurate acoustic emission signals and substantially less signal interference are achieved for the rock mechanics test system 1 under high temperature and high pressure.

Embodiment 2

On the basis of Embodiment 1, the structure is further optimized in this embodiment. In order to ensure the acoustic emission sensor to more stably fit with a test point, the cover spring 8-1-1 applies a positive pressure from the back of the acoustic emission sensor such that the acoustic emission sensor can be closely fitted with the outer wall of the triaxial cavity 6. The cover spring 8-1-1 may use a spring with different pitches at the upper and lower parts of the spring, or may use an equal-pitch spring, or may use an unequal-diameter spring or an equal-diameter spring.

Other parts of this embodiment are the same as those in the above embodiment, and thus their detailed descriptions are omitted herein.

Embodiment 3

On the basis of Embodiment 1, the structure is further optimized in this embodiment.

To better adapt to high-temperature test environment, the clamp cylinder 8-2 includes an outer metal cylinder, an inner heat insulation cylinder, and a condenser pipe. Between the coaxially sleeved outer metal cylinder and inner heat insulation cylinder a condensation cavity is formed. The cavity is in communication with the condenser pipe allowing condensate to be introduced.

Other parts of this embodiment are the same as those in the above embodiment, and thus their detailed descriptions are omitted herein.

Embodiment 4

On the basis of Embodiment 1, the structure is further optimized in this embodiment.

To facilitate the arrangement of the signal line, in this embodiment, the cylinder wall of the clamp cylinder 8-2 is provided with the arc-shaped notch 8-2-1, and the coupling panel 8-4 is provided with a circular hole. Specifically, one end of the cylinder wall of the clamp cylinder 8-2 is provided with the arc-shaped notch 8-2-1 whose frontal projection plane is shaped like an inverted "U". The groove 8-4-1 is respectively arranged at edges near the left and right sides on the upper surface of the coupling panel 8-4, and two small-diameter circular holes are provided outside the groove 8-4-1.

Other parts of this embodiment are the same as those in the above embodiment, and thus their detailed descriptions are omitted herein.

Embodiment 5

On the basis of Embodiment 1, the structure is further optimized in this embodiment.

In order to better explain the connection between the clamp fixing spring 7 and the acoustic emission sensor, two ends of the acoustic emission sensor are respectively provided with a small hole allowing the connector of the clamp fixing spring 7 to pass through. Two adjacent acoustic emission sensors are directly connected through one clamp fixing spring 7, or two adjacent acoustic emission sensors are connected through a plurality of clamp fixing springs 7 connected in series.

Other parts of this embodiment are the same as those in the above embodiment, and thus their detailed descriptions are omitted herein.

Embodiment 6

On the basis of Embodiment 1, the structure is further optimized in this embodiment. N acoustic emission sensors are arranged at corresponding positions at the upper end of a test piece. N acoustic emission sensors are arranged at corresponding positions on the lower end of the test piece. 2N acoustic emission amplifiers 23 are correspondingly connected to a respective 2N acoustic emission sensor and are uniformly arranged on the lifting support plate 22 through electric signal lines.

In the test process, the height of the test piece indenter 9 is adjusted by the triaxial cavity lifting oil cylinder 2 driven by the upright column 5, while the triaxial lifting oil cylinder 2 drives, via the lifting rod 3, the upper part of the triaxial cavity 6 where the lower lifting end 4 is mounted to move up and down. At this moment, the set of acoustic emission detection heads at corresponding upper end position of the test piece may be driven to move up and down, accordingly. In order to implement balanced coordination of the real-time positions of all acoustic emission sensors, the lifting support plate 22 is driven by the support plate lifting oil cylinder 24 to move linearly along the upright column 20 which includes a guide rail to implement concomitant height adjustment.

Specific structures are as below: the upper end of the upright column 20 having the guide rail is provided with a linear guide rail, and two ends of the lifting support plate 22 are respectively mounted with a pulley embedded into the linear guide rail and linearly slidable along the linear guide rail.

Other parts of this embodiment are the same as those in the above embodiment, and thus their detailed descriptions are omitted herein.

Embodiment 7

According to an evaluation method based on acoustic emission tempo-spatial evolution laws, the rock mechanics test system 1 mounted with a system for monitoring rock damage in deep engineering environments is employed to analyze an AE fractal characteristic of an acoustic emission tempo-spatial evolution process in a whole process of tensile deformation of salt rock. A fractal dimension of acoustic emission spatial distribution is calculated using a column covering method to obtain an AE characteristic relationship curve associated with an acoustic emission locating point. And a relationship between stress, energy and fractal dimension of salt rock in different tensile conditions is analyzed based on energy variation in the whole process of the tensile deformation.

Specifically, the AE characteristic relationship curve includes a curve of relationship between stress, ring count and time; a curve of relationship between stress, accumulated ring count and time; a curve of relationship between stress, energy rate and time; and a curve of relationship between stress, accumulated energy and time.

For brittle materials such as salt rock, under the action of tensile stress, there is inevitably dislocation and slippage between grains, as well as generation, aggregation and penetration of micro-cracks, which may generate a large amount of acoustic emission. Therefore, it is extremely effective to describe the damage evolution of salt rock during different tensile tests using acoustic emission.

Figure 25:
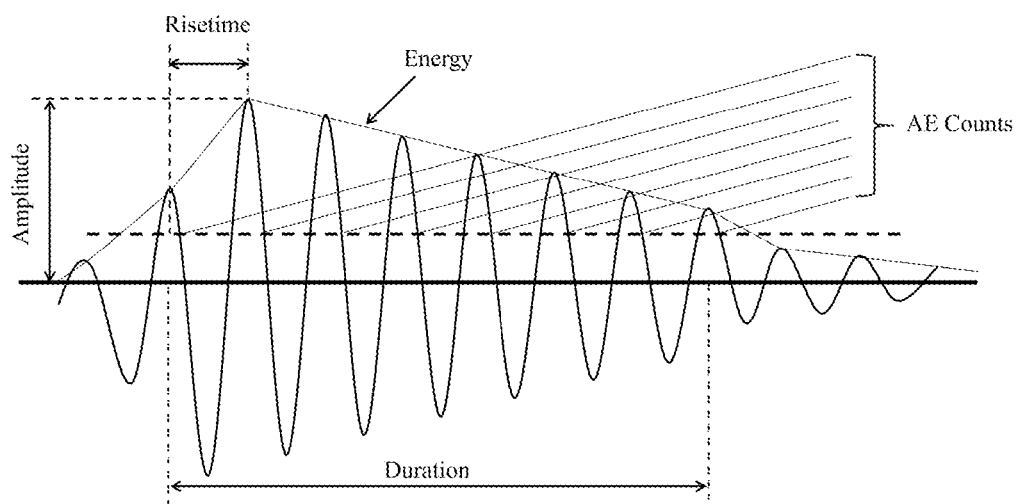
FIG. 25 is a schematic diagram showing parameters involved in an acoustic emission event.

In the indoor three-dimensional acoustic emission monitoring of the rock damage process, the micro-fracture distribution of the rock damage is transformed into the spatial distribution of acoustic emission events. A certain signal monitored is micro-fracture information indicating that an amplitude A of an acoustic emission event is not less than a certain amplitude level A0. As shown in FIG. 25, the energy magnitude of a transient acoustic emission signal may be obtained by performing envelope detection on the amplitude A. The ring count rate is the number of intersections between the acoustic wave curve and the threshold voltage. Therefore, the number of the acoustic emission events reflects the degree of damage inside the rock. The more acoustic emission events are, the more the micro-fractures inside the rock are, the larger the ring count is, and in turn, the larger is the energy rate.

Acoustic emission parameters of salt rock show different characteristics in different tensile stress damage processes, wherein the ring count rate and the energy rate can best reflect the damage development process of the rock breaking process, and show the intensity of the rock tensile damage process. Combined with the stress state of the rock, the development and evolution of the salt rock damage during the entire experiment may be revealed. Meanwhile, by means of three-dimensional tempo-spatial evolution of acoustic emission, the damage and breaking state of salt rock in different time periods and different parts may be accurately located.

In the fractal research method of this embodiment, a rock test piece is tested using the MTS815 rock mechanics test system 1 equipped with a system for monitoring rock damage in deep engineering environment. Acoustic emission phenomena in the deformation and damage process of the test piece are monitored in real time by means of acoustic emission monitoring to study the acoustic emission characteristics of salt rock during loading and unloading processes under different tensile conditions. For example, based on the acoustic emission ring count, energy, and three-dimensional tempo-spatial evolution laws, corresponding stress states and damage evolution laws under different tensile conditions are revealed in order to obtain impact of the tensile conditions and stress paths on the acoustic emission parameters of salt rock.

Embodiment 8

This embodiment is a further improvement over Embodiment 7. In this embodiment, specifically a salt rock test piece is taken as an example. A three-point bending tensile test, an indirect tensile test, a direct tensile test, and an alternating tension and compression test are respectively performed on the salt rock test piece using the rock mechanics test system 1, which is described specifically below.

In the tensile test, eight Micro30 acoustic emission sensors are employed to monitor the fracture process of a rock sample in real time. Four acoustic emission sensors are evenly arranged at each end of the rock sample. The working frequency of the acoustic emission sensor ranges from 100 kHz to 600 kHz. The gain and trigger threshold of the preposed acoustic emission amplifier 23 are set as 40 dB. Vaseline is used as a coupling agent of the acoustic emission sensor to enhance the test effect. During the test, an axial load of the test piece is synchronously inputted, through an MTS 815 test general control system, into an AE three-dimensional positioning system connected to the system for monitoring rock damage in deep engineering environment, such that the acoustic emission sensors arranged at two ends of the test piece monitors, in real time, acoustic emission signal information collected in the test process indicating formation and development of micro-cracks, and aggregation and penetration of macro-cracks; and the monitored data are displayed by a display device connected to the AE three-dimensional positioning system.

Rock damage in the loading process is closely related to the generation and expansion of internal micro-cracks. In this process, the rock may release elastic wave energy. That is, an acoustic emission phenomenon occurs. Locations of acoustic emission space positioning points constitute a spatial distribution, and each point corresponds to a fracture surface and a fracture volume in physical space. From the spatial distribution of these point sets, fractal characteristics of the rock damage evolution process may be directly measured. Supposing this distribution is a circle or a sphere whose center point is x and radius is r, the number of AE signal points $M_{(r)}$ included in the circle or the sphere may be measured. If this distribution is a linear distribution, $M_{(r)} \propto r^2$; if this distribution is a planar distribution, $M_{(r)} \propto r^2$; if this distribution is a volume distribution, $M_{(r)} \propto r^3$. According to the basic theory of fractals, the number-radius relationship of the AE distribution may be expressed using the equation as below:

$$M_{(ri)} = Cr^{D_f} \tag{6-1}$$

By taking the logarithm for factors in the above equation, another equation may be obtained as below:

$$\log M_{(ri)} = \log C + D_f \log r \tag{6-2}$$

In the above equation, different radii $r_i$ are taken to obtain corresponding $M_{(ri)}$. Different points ($\log r_i$, $\log M_{(ri)}$) are drawn in logarithmic coordinates, and are fitted using a least square method. If better linear characteristics are present between the number and the radius, it may be believed that under different stress conditions, the AE spatial distribution signal points of the test piece under different loads in the loading process have self-similarity. That is, the AE spatial distribution has fractal characteristics.

Locations of acoustic emission space positioning points constitute a spatial distribution, and each point corresponds to a fracture surface and a fracture volume in physical space. From the spatial distribution of these point sets, fractal characteristics of the rock damage evolution process may be directly measured.

Under the load effect, as the rock deformation increases, the mechanical energy generated by the load will be continuously converted into internal energy of the rock, such that the rock is in a high-energy internal state. This process is often accompanied by energy dissipation, such as thermal radiation and acoustic emission. At different loading stages, strain energy of the rock may be obtained from a stress-strain curve of the rock, and the total energy of the rock may be calculated from the strain energy and the volume of the rock. Once the stress-strain curve of the test piece is known, the strain energy and absorbed energy at various stages of rock damage may be obtained by the following equation:

$$W' = \int \sigma d\varepsilon \tag{6-3}$$

$$W = \int \sigma d\varepsilon * V \tag{6-4}$$

Xie Heping calculated and obtained the correlational relationship between energy release and fractal dimension by making a fractal analysis of the microseismic event at Sunagawa Coal Mine in Japan, and found that this result is consistent with the relationship between energy release rate and fractal dimension obtained from the theoretical analysis of rockburst. After making a summary, Xie Heping concluded a unified expression as below:

$$D_f = C_1 \exp[-C_2 W] \tag{6-5}$$

Equation (6-5) indicates that the energy release increases exponentially as the fractal dimension decreases. By analyzing the uniaxial compression, indirect tensile and triaxial compression test results, it is found that Equation (6-5) can describe the relationship, obtained by test, between the energy release and the fractal dimension. However, in comparison, the correlational relationship expressed by a power function is better. The relationship between energy release and fractal dimension of the salt rock test piece under different stress conditions will be described below using the power function, i.e., $$D_f = C_3 W^{(-C_4)} \tag{6-6}$$

In the above equation, C3 and C4 represent parameters related to rock properties, and W represents energy release during rock deformation and damage.

I. Fractal Characteristics of Acoustic Emission Under Three-Point Bending

Based on three-point bending acoustic emission localization test results of the salt rock, a fractal dimension $D_f$ of the AE spatial location is calculated using a column covering fractal theory. Studies showed that the logarithm of the size r and the logarithm of the number of AE events $M_{(r)}$ in a cylinder are linear in relationship within a certain range. The AE spatial distribution locating points of pure salt rock in the whole loading and unloading process of the three-point bending have self-similarity. That is, the AE spatial distribution has fractal characteristics.

The stress peak ratio, energy and fractal dimension $D_f$ of the damage process of two salt rock test pieces are calculated from Equation (6-2) and Equation (6-4) and are shown in Table 6-1. The stress peak ratio of the test piece is a ratio of different stress stages to peak stress of the test piece. For example, the stress peak ratio of 10%, 20%, 30%, 40%, 50%, 60%, 70%, 80%, 90% and 100% are selected to make an analysis. The energy and the fractal dimension respectively are total work generated at this stress stage and fractal dimension corresponding to the total work.

FIG. 17A, FIG. 17B, FIG. 18A and FIG. 18B respectively show a relationship between fractal dimension and stress peak ratio and a relationship between fractal dimension and energy of two salt rock test pieces in a three-point bending test, wherein the relationship between the energy and the fractal dimension thereof is as shown in Equation (6-7).

$$\begin{cases} \text{Test piece d-1:} & D_f = 2.7829 W^{-0.026} \\ \text{Test piece d-8:} & D_f = 2.9002 W^{-0.036} \end{cases} \tag{6-7}$$

The energy is calculated as the product of an axial force and an axial load point displacement (LPD), i.e., the area enclosed by a three-point bending load-LPD curve and the abscissa, which may be calculated by importing data into software. The fractal dimension of the acoustic emission localization map under different stress ratios is calculated by generating a TXT file from a three-dimensional coordinate point data set via fractal calculation software.

TABLE 6-1

Fractal calculation results of acoustic emission locating points of salt rock under three-point bending conditions

| Test piece number | Stress peak ratio % | Energy W ($10^{-3}$ J) | Calculated fractal dimension $D_f$ | Test piece number | Stress peak ratio % | Energy W ($10^{-3}$ J) | Calculated fractal dimension $D_f$ |
|---|---|---|---|---|---|---|---|
| d-1 | 10 | 0.23 | 2.84 | d-8 | 10 | 0.64 | — |
| Pure salt | 20 | 0.48 | 2.82 | Polyhalite | 20 | 1.28 | 2.81 |
| rock | 30 | 1.00 | 2.80 | salt rock | 30 | 2.56 | 2.79 |
|  | 40 | 2.10 | 2.79 |  | 40 | 5.13 | 2.77 |
|  | 50 | 4.41 | 2.70 |  | 50 | 10.30 | 2.70 |
|  | 60 | 9.24 | 2.65 |  | 60 | 20.67 | 2.65 |
|  | 70 | 19.37 | 2.56 |  | 70 | 41.48 | 2.53 |
|  | 80 | 40.60 | 2.49 |  | 80 | 83.24 | 2.47 |
|  | 90 | 85.10 | 2.46 |  | 90 | 167.02 | 2.38 |
|  | 100 | 178.36 | 2.44 |  | 100 | 335.14 | 2.33 |

The calculation results are as shown in Table 6-1. "-" in the table indicates that there is no fractal characteristic at this stress stage.

Figure 17A:
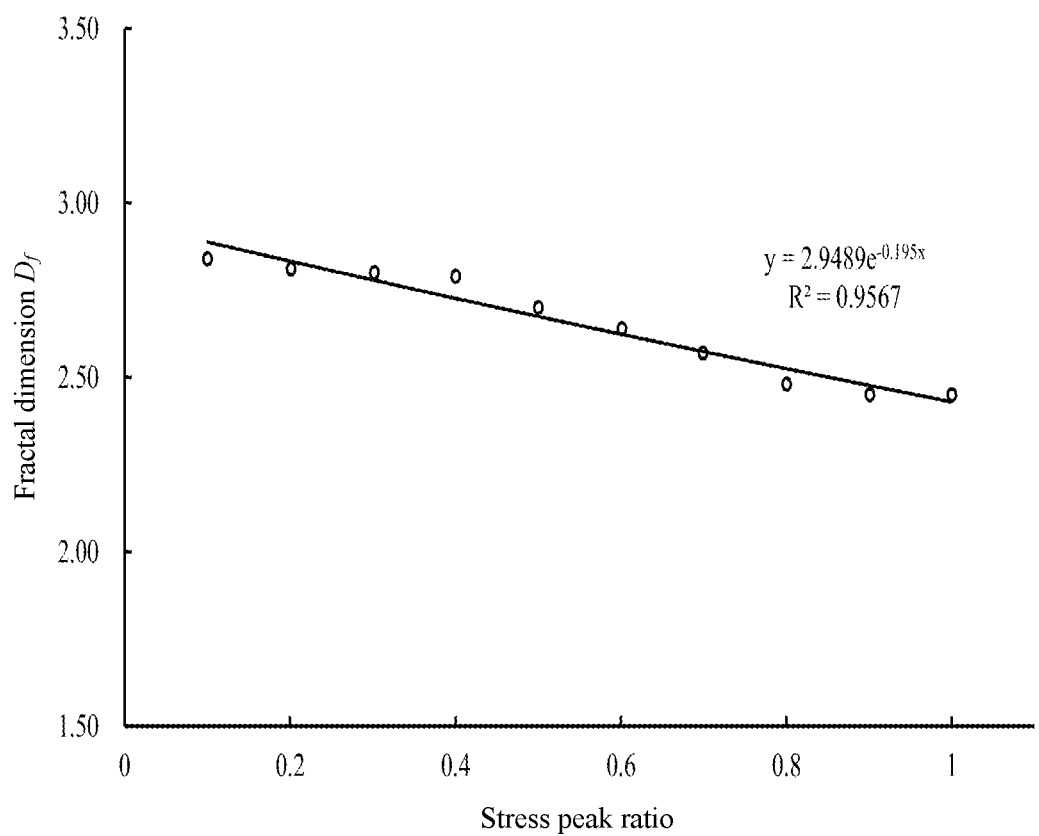
FIG. 17A is a schematic diagram showing the relationship between the stress peak ratio and the fractal dimension of pure salt rock d-1 in a three-point bending test.
Figure 17B:
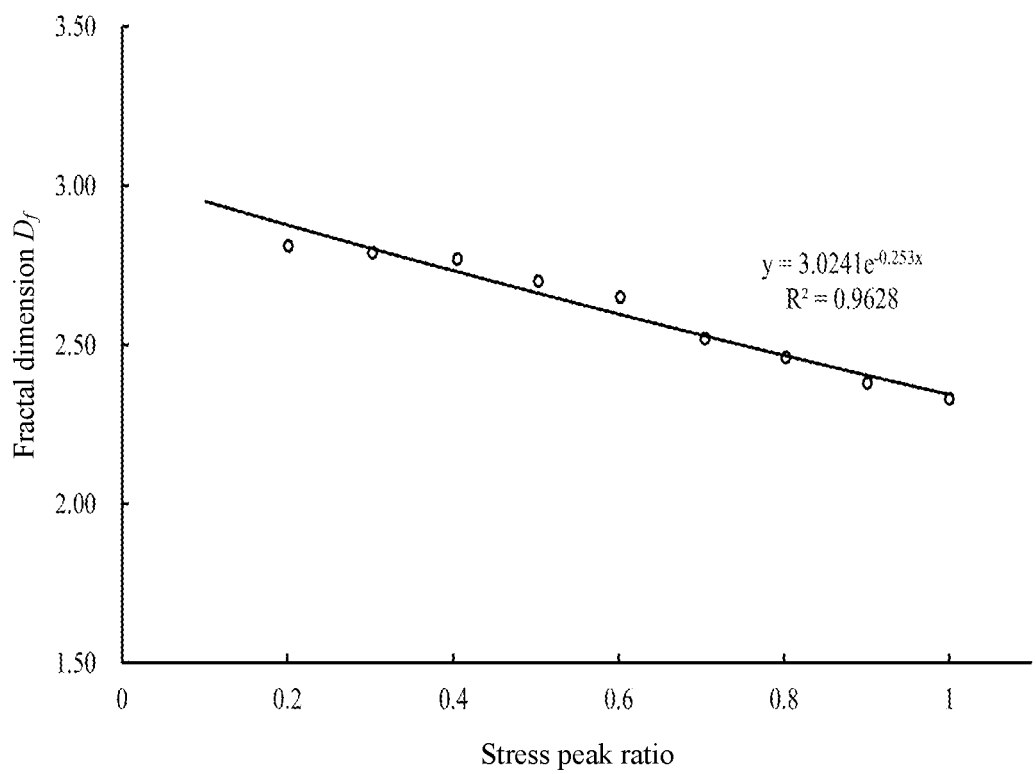
FIG. 17B is a schematic diagram showing the relationship between the stress peak ratio and the fractal dimension of polytalite salt rod d-8 in a three-point bending test.

As shown in FIG. 17A and FIG. 17B, schematic diagrams showing the relationship between the fractal dimension and the stress peak ratio are illustrated. Under bending and tensile conditions, the fractal dimension gradually decreases as the load increases and gradually decreases as the energy increases. As can be understood, as the load stress increases, the internal damage of the salt rock and the AE signal points increase, and the damage gradually accumulates at the damaged part of the test piece and forms macro-cracks. When the load reaches the peak stress, the fractal dimension reaches the minimum.

Figure 18A:
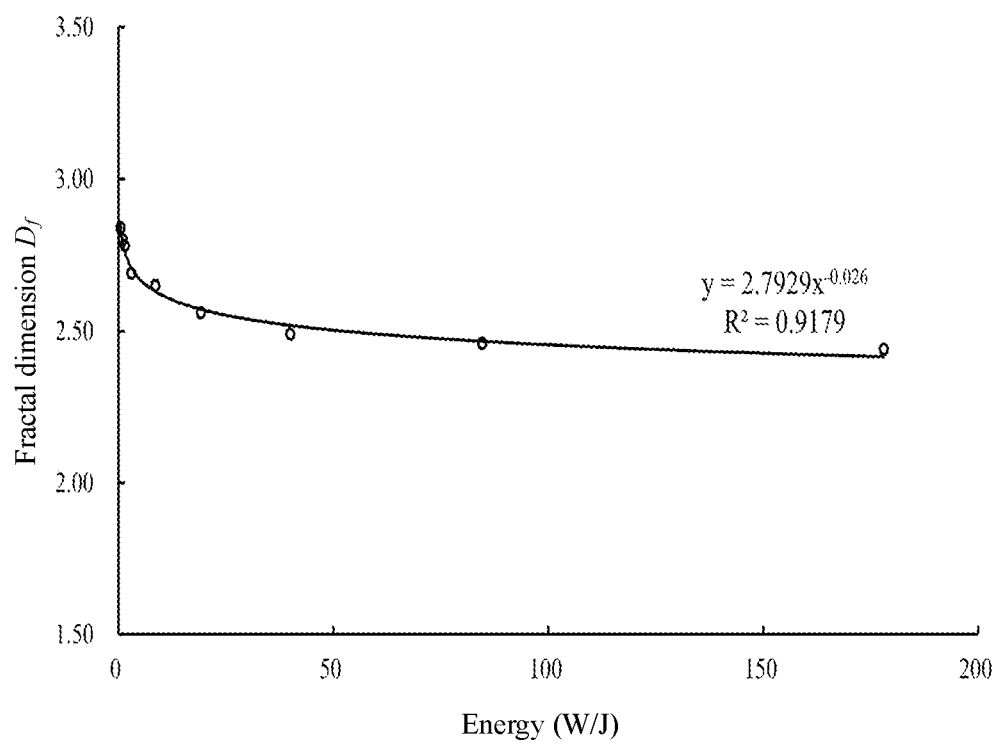
FIG. 18A is a schematic diagram showing the relationship between energy and the fractal dimension of pure salt rock d-1 in a three-point bending test.
Figure 18B:
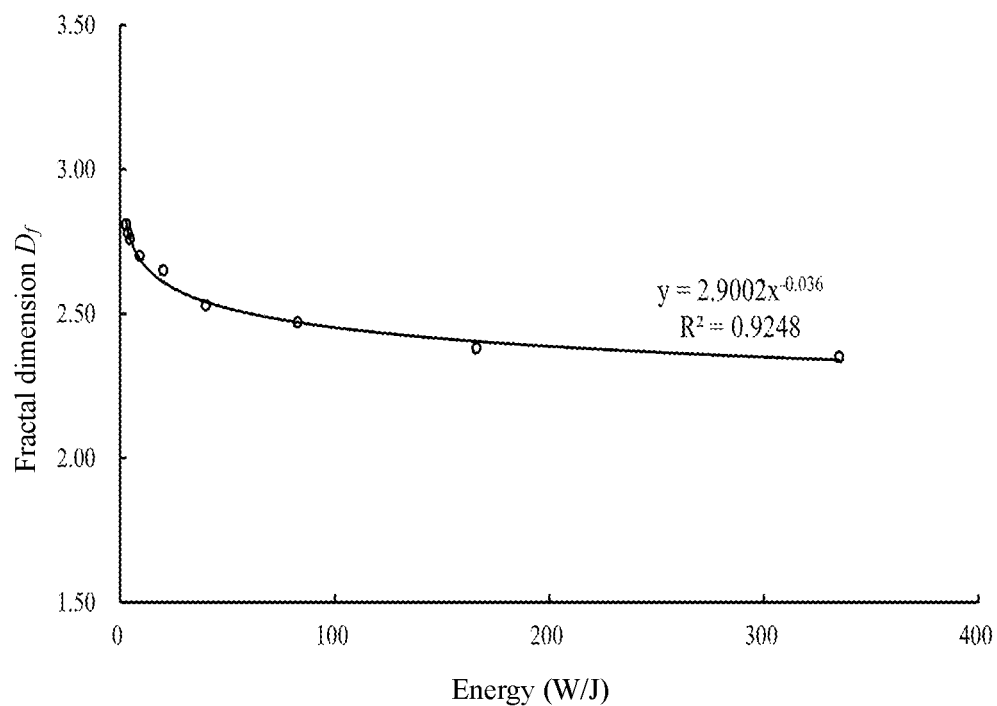
FIG. 18B is a schematic diagram showing the relationship between energy and the fractal dimension of polytalite salt rod d-8 in a three-point bending test.
Figure 19A:
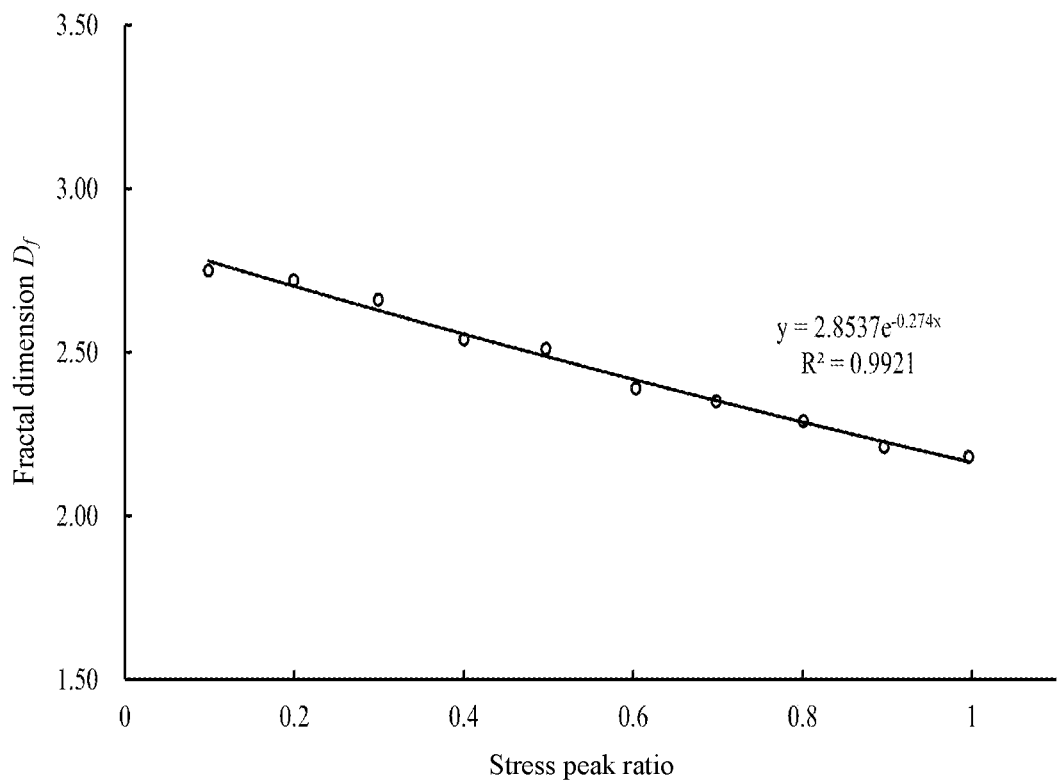
FIG. 19A is a schematic diagram showing the relationship between the stress peak ratio and the fractal dimension of pure salt rock test piece f-3 in an indirect tensile test.
Figure 19B:
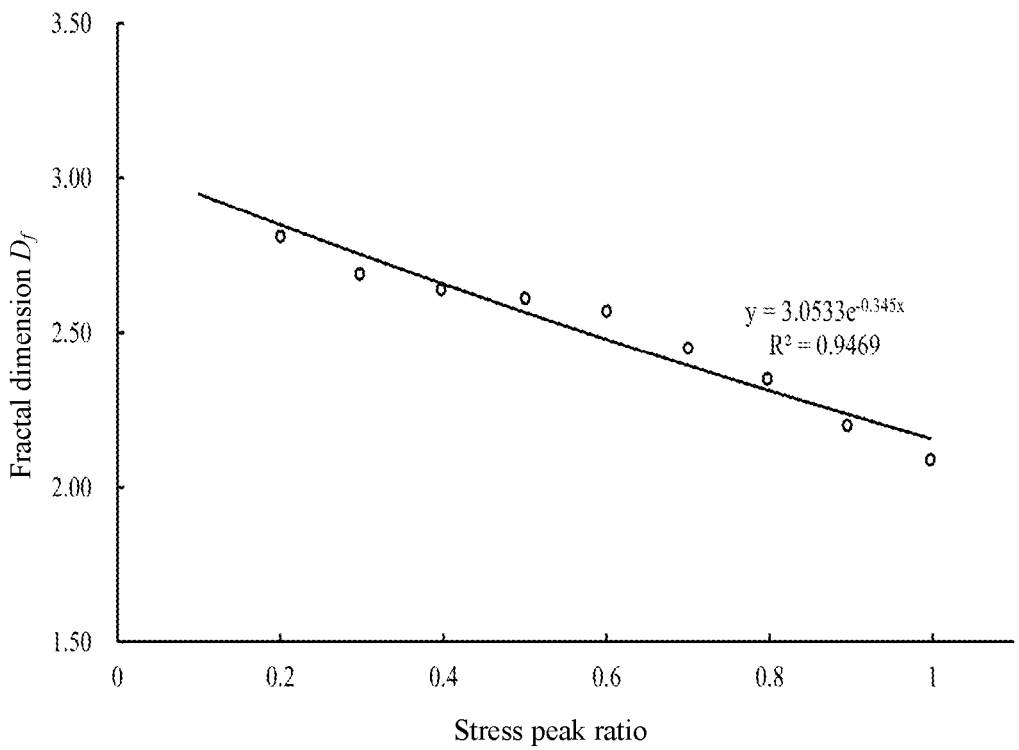
FIG. 19B is a schematic diagram showing the relationship between the stress peak ratio and the fractal dimension of impure salt rock test piece zp-2 in an indirect tensile test.
Figure 20A:
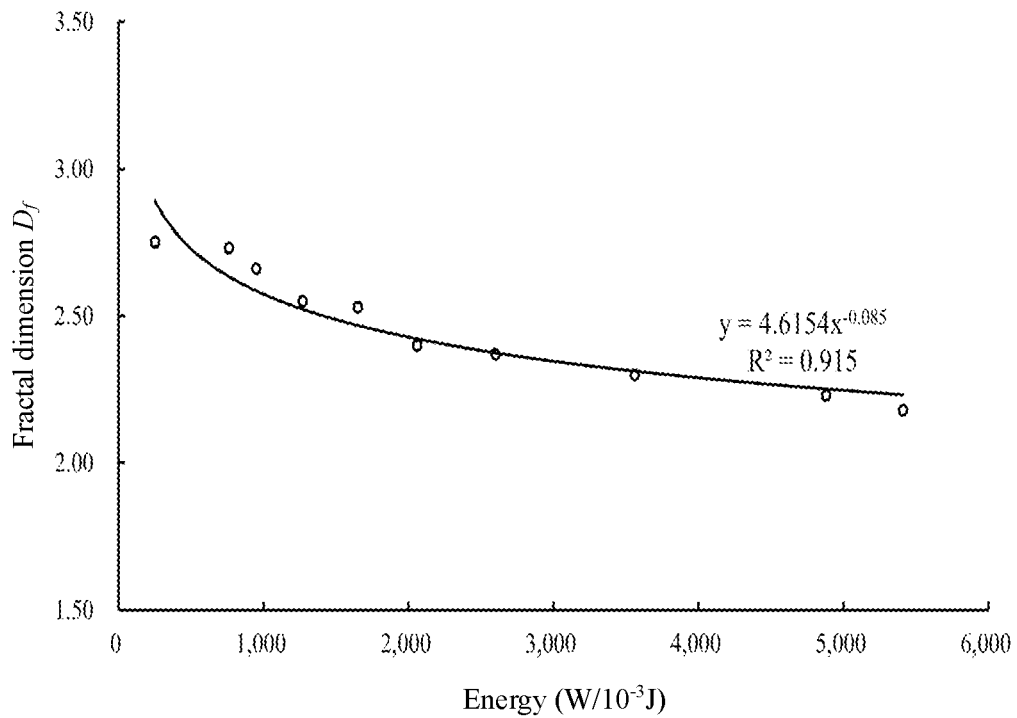
FIG. 20A is a schematic diagram showing the relationship between energy and the fractal dimension of pure salt rock test piece f-3 in an indirect tensile test.
Figure 20B:
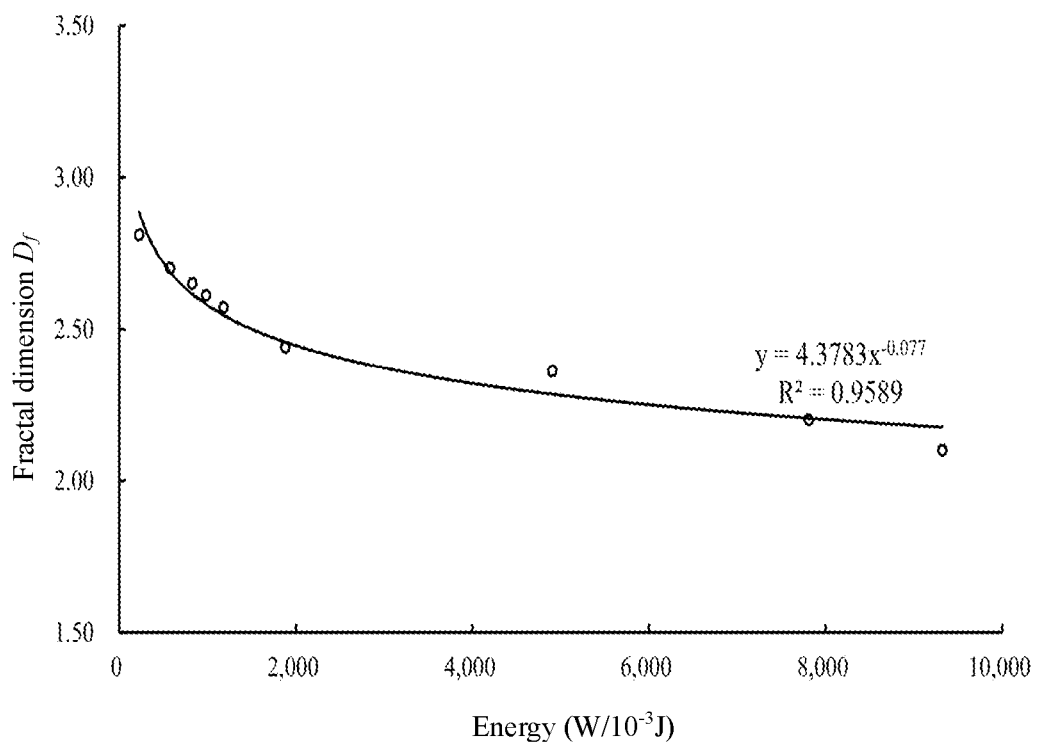
FIG. 20B is a schematic diagram showing the relationship between energy and the fractal dimension of impure salt rock test piece zp-2 in an indirect tensile test.
Figure 21A:
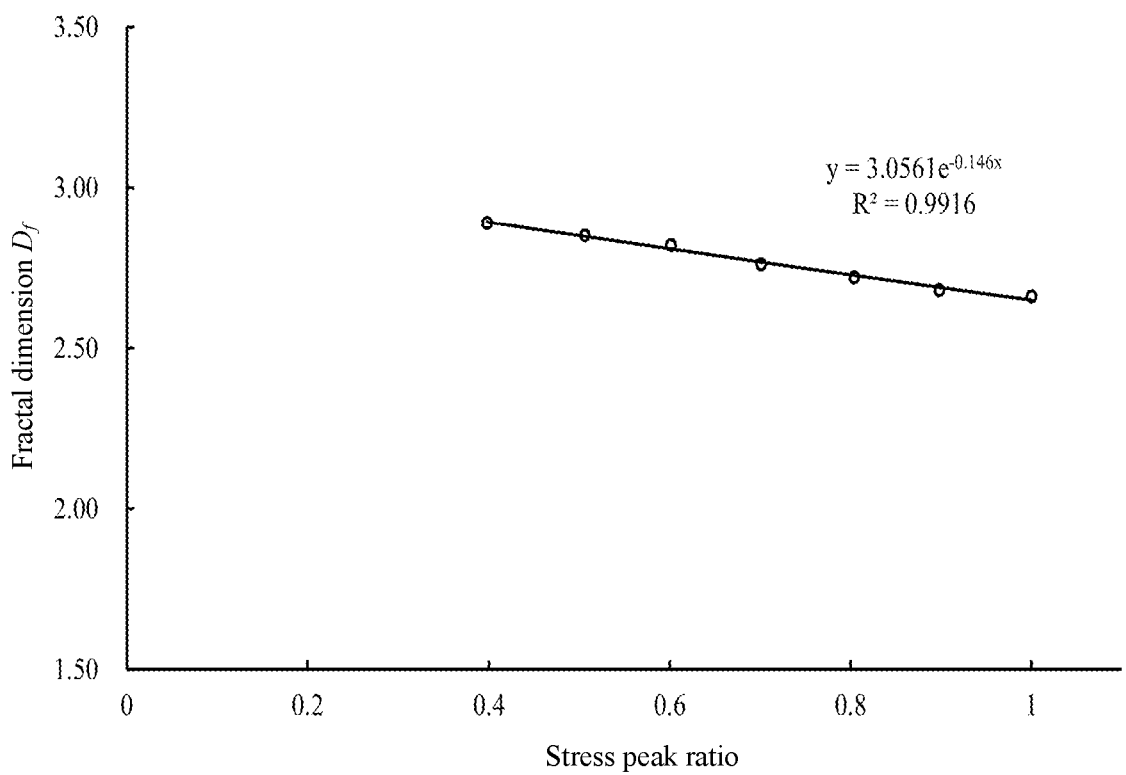
FIG. 21A is a schematic diagram showing the relationship between the stress peak ratio and the fractal dimension of pure salt rock ut-3 in a direct tensile test.
Figure 21B:
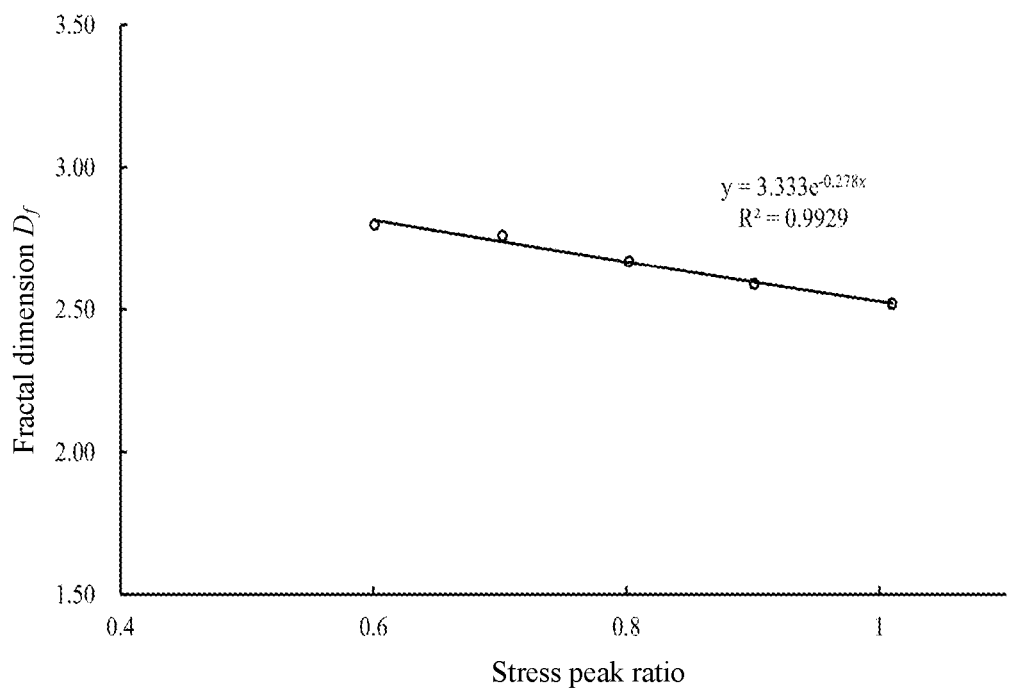
FIG. 21B is a schematic diagram showing the relationship between the stress peak ratio and the fractal dimension of polyhalite salt rock ly-2 in a direct tensile test.
Figure 22A:
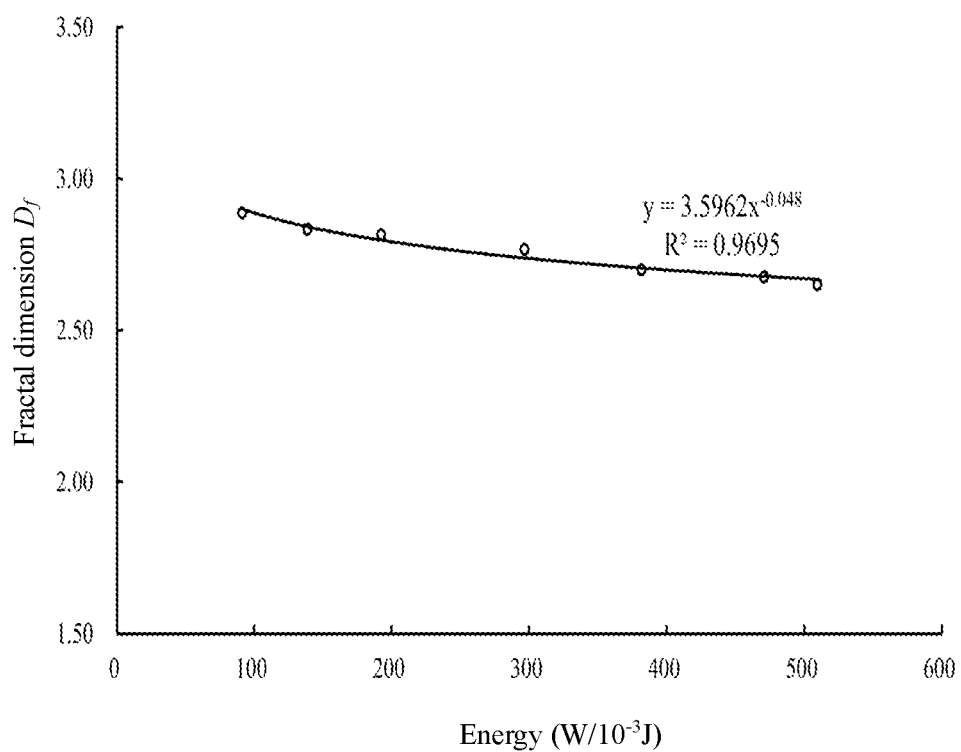
FIG. 22A is a schematic diagram showing the relationship between energy and the fractal dimension of pure salt rock ut-3 in a direct tensile test.
Figure 22B:
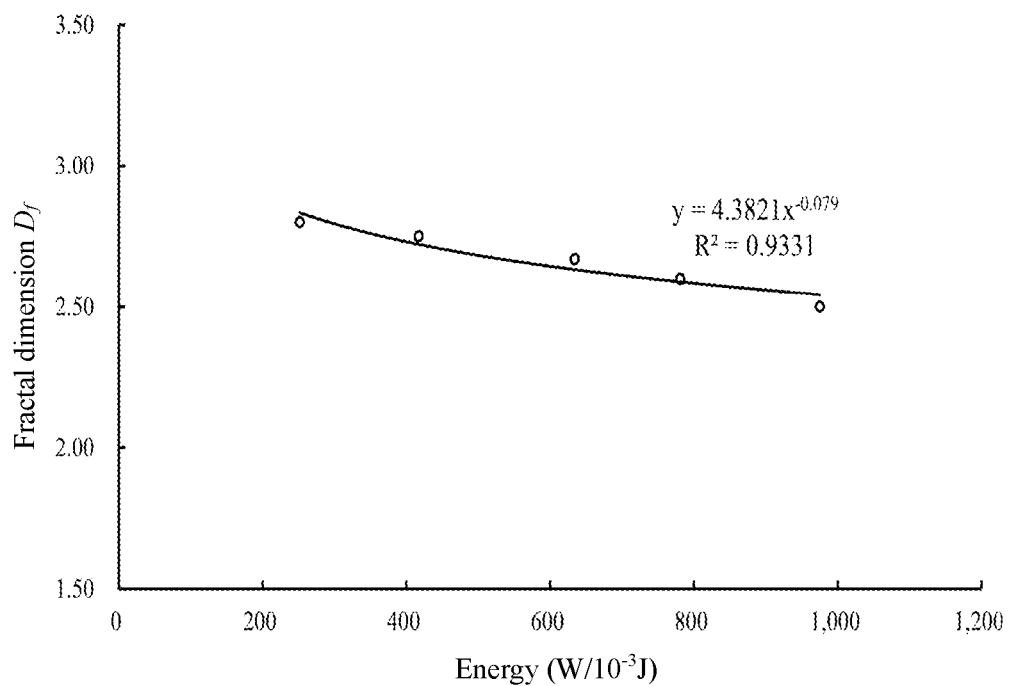
FIG. 22B is a schematic diagram showing the relationship between energy and the fractal dimension of impure salt rock ly-2 in a direct tensile test.
Figure 23A:
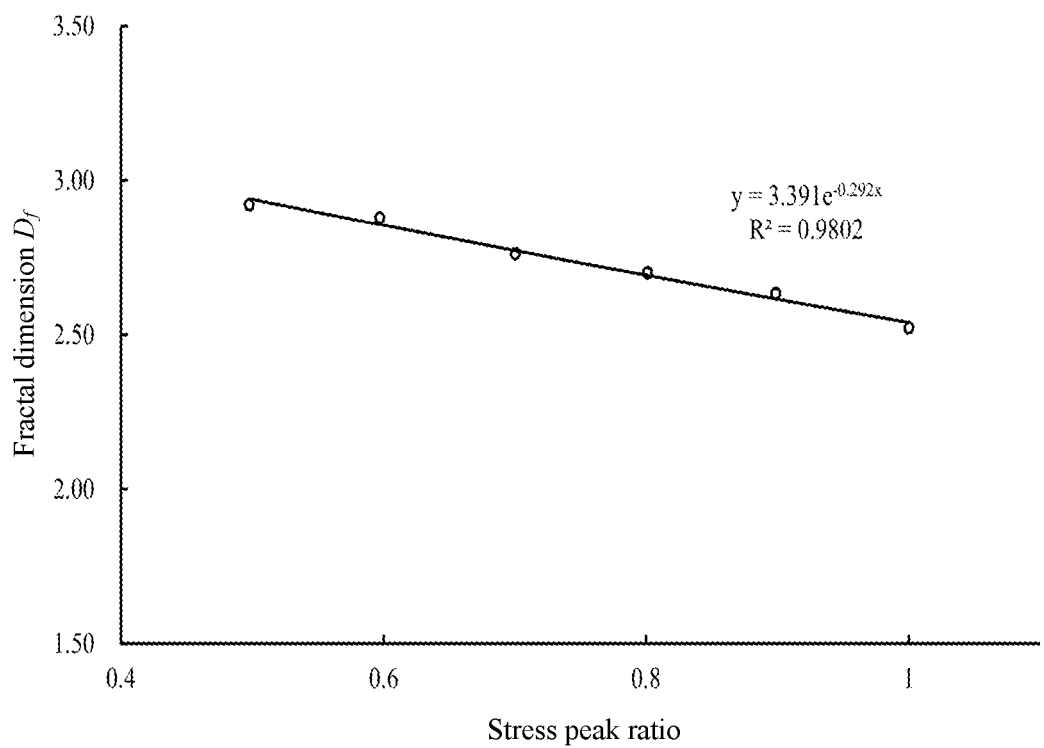
FIG. 23A is a schematic diagram showing the relationship between the stress peak ratio and the fractal dimension of pure salt rock UT-10 in an alternating tension and compression test.
Figure 23B:
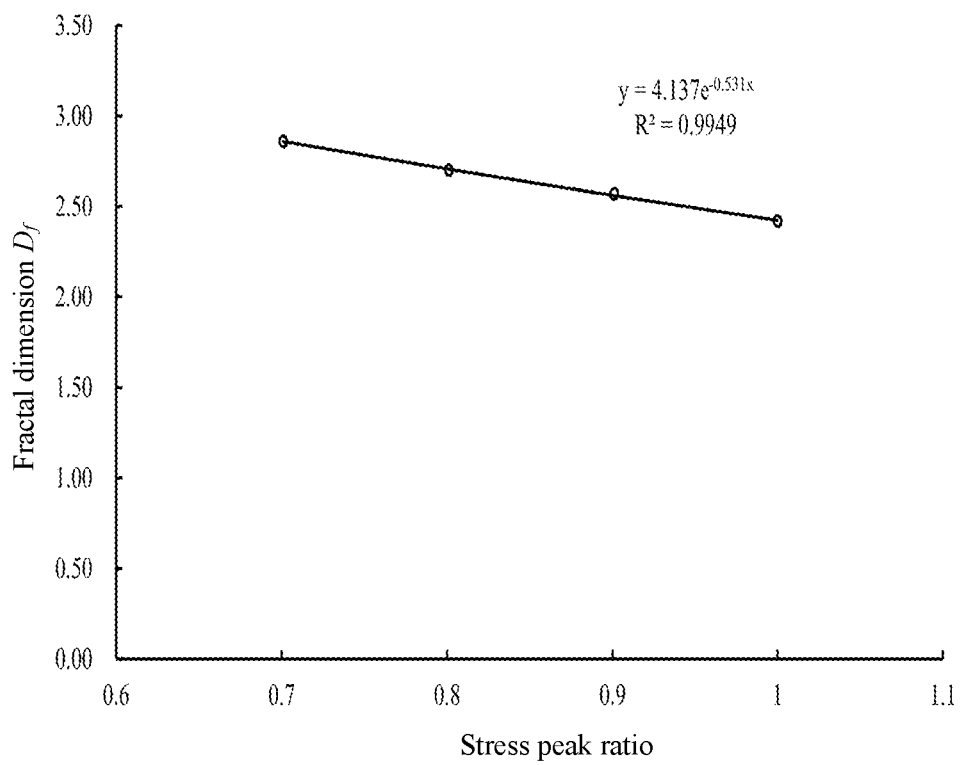
FIG. 23B is a schematic diagram showing the relationship between the stress peak ratio and the fractal dimension of impure salt rock LY-12 in an alternating tension and compression test.
Figure 24A:
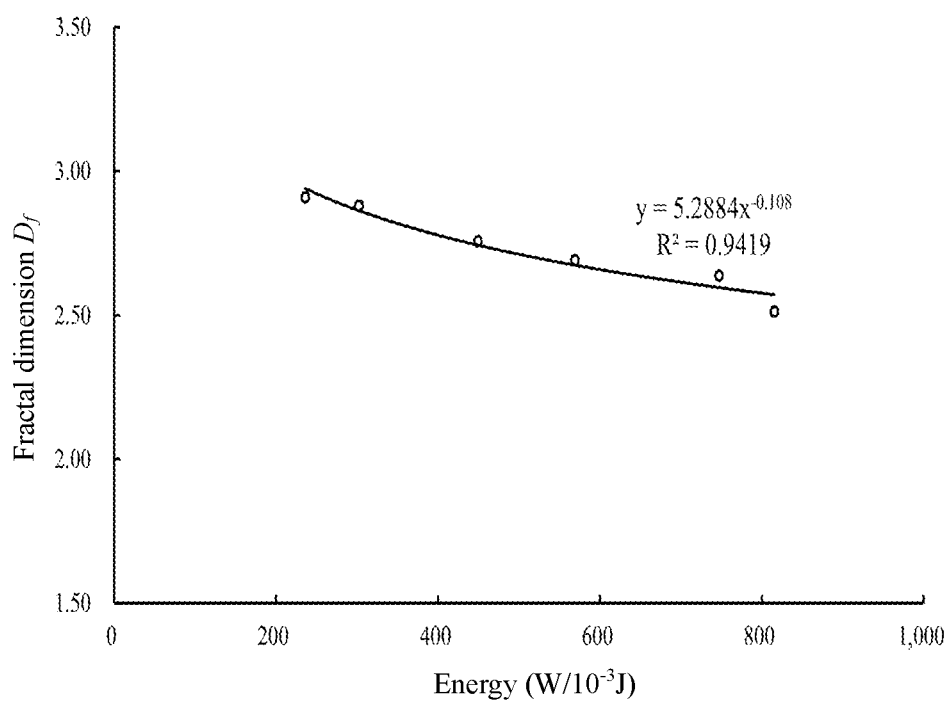
FIG. 24A is a schematic diagram showing the relationship between energy and the fractal dimension of pure salt rock UT-10 in an alternating tension and compression test.
Figure 24B:
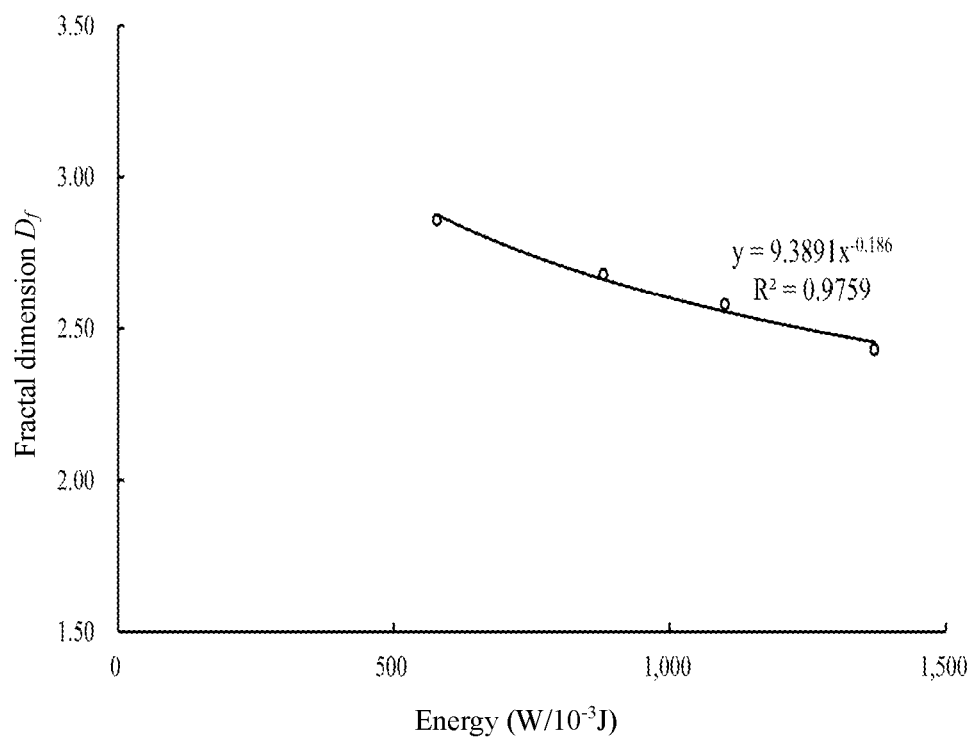
FIG. 24B is a schematic diagram showing the relationship between energy and the fractal dimension of impure salt rock LY-12 in an alternating tension and compression test.

As shown in FIG. 18A and FIG. 18B, schematic diagrams showing the relationship between the fractal dimension and the energy are illustrated. At the initial stage of loading, the fractal dimension is large and dense, and the energy release is small. As the load increases, the fractal dimension gradually decreases, and the fractal dimension is distributed sparsely, and the energy release suddenly increases when the load is about to reach a peak value. Aggregation of internal damage of the test piece occurs.

As can be seen by analyzing data in Table 6-1, the polyhalite salt rock d-8 does not show fractal characteristics at the initial stage. This is because before the peak stress of 10%, the polyhalite salt rock has higher strength and higher stiffness than the pure salt rock, such that no obvious acoustic emission signal is generated under low stress conditions, and thus no fractal characteristic appears. When the fractal dimension is reduced to 2.4-2.5, a large number of aggregated damages may occur inside the salt rock test piece, and the bearing capacity has exceeded the peak stress of 80% and even has reached the peak load. At this moment, penetrating damage may be formed inside the test piece.

Comparing the two types of lithology, the fractal dimension of the polyhalite salt rock is lower than that of the pure salt rock under any stress condition. This process corresponds to the mechanical characteristics, acoustic emission location characteristics, and fractal dimension of fracture surface roughness. In the damage process, the polyhalite salt rock forms normalized cracks, has less deformation, and forms fractal dimension of fracture surface roughness lower than the pure salt rock, and a rule is concluded that acoustic emission fractal dimension characteristics are the same. The fractal dimension of the acoustic emission location map at the peak moment of the polyhalite salt rock is 2.33, whereas the fractal dimension of the acoustic emission location map at the peak time of the pure salt rock is 2.44. This shows that the accumulation of acoustic emission localization signals of the polyhalite salt rock occurs more intensively than that of the pure salt rock during the peak damage process. A plurality of cracks are caused in the damage process of the pure salt rock, and the acoustic emission signals are more scattered, resulting in larger fractal dimension of the acoustic emission locating point at the peak moment of the pure salt rock, such that the finally formed fractal dimension of fracture surface roughness of the pure salt rock is larger than that of the polyhalite salt rock.

II. Fractal Characteristics of Acoustic Emission Under Indirect Tension

Under indirect tensile stress conditions, the fractal characteristics of the salt rock are calculated using the column covering method, and the fractal dimension of the AE spatial distribution is calculated. It is discovered that the logarithm of the size r and the logarithm of the number of AE events $M_{(r)}$ in a cylinder are better in logarithmic linear correlation within a certain range. The pure salt rock test piece f-3 and the impure salt rock test piece zp-2 are to be selected as examples for analysis. The stress peak ratio, energy and fractal dimension $D_f$ of the salt rock test pieces calculated using Equation (6-2) and Equation (6-4) are as shown in Table 6-2. The meanings in Table 6-2 are the same as those in Table 6-1.

TABLE 6-2

Fractal calculation results of acoustic emission locating points of salt rock test pieces under indirect tension conditions

| Test piece number | Stress peak ratio % | Energy W ($10^{-3}$ J) | Calculated fractal dimension $D_f$ | Test piece number | Stress peak ratio % | Energy W ($10^{-3}$ J) | Calculated fractal dimension $D_f$ |
|---|---|---|---|---|---|---|---|
| f-3 | 10 | 255.64 | 2.75 | zp-2 | 10 | 189.31 | — |
| Pure salt | 20 | 749.57 | 2.72 | Impure | 20 | 234.59 | 2.77 |
| rock | 30 | 952.36 | 2.65 | salt rock | 30 | 569.49 | 2.69 |
|  | 40 | 1254.35 | 2.55 |  | 40 | 855.94 | 2.65 |
|  | 50 | 1658.26 | 2.51 |  | 50 | 1000.97 | 2.61 |
|  | 60 | 2076.50 | 2.39 |  | 60 | 1173.35 | 2.57 |
|  | 70 | 2615.31 | 2.36 |  | 70 | 1918.33 | 2.45 |
|  | 80 | 3578.46 | 2.30 |  | 80 | 4894.34 | 2.35 |
|  | 90 | 4891.34 | 2.22 |  | 90 | 7786.21 | 2.20 |
|  | 100 | 5423.10 | 2.18 |  | 100 | 9320.70 | 2.10 |

FIG. 19A, FIG. 19B, FIG. 20A and FIG. 20B respectively show the relationship between the fractal dimension and the stress peak ratio and the relationship between the fractal dimension and the energy of two salt rock test pieces under indirect tension conditions, wherein the relationship between the energy and the fractal dimension of the pure salt rock test piece f-3 and the impure salt rock test piece zp-2 is as shown in Equation (6-8).

$$\begin{cases} \text{Test piece f-3: } D_f = 4.6154W^{-0.085} \\ \text{Test piece zp-2: } D_f = 4.3783W^{-0.077} \end{cases} \quad (6\text{-}8)$$

Calculations of the energy and the acoustic emission spatial distribution fractal dimension of the salt rock test piece under indirect tensile stress conditions is the same as that under bending tension. The indirect tensile energy is the total work, i.e., the area enclosed by axial load and axial deformation on the load-deformation curve. As can be seen from Table 6-2 and FIG. 19A, FIG. 19B, FIG. 20A and FIG. 20B, under the indirect tensile stress conditions, the AE spatial distribution fractal dimension of the salt rock test piece gradually decreases as the stress and energy of the test piece increase. As the stress increases, the AE signal point gradually expands and penetrates into the middle of the test piece from a loading contact part. This indicates that the damage accumulates along the loading direction, and the fractal dimension of the test piece is the minimum when a macro tensile crack is formed, and the energy release reaches the maximum at this moment.

As can be seen by analyzing indirect tensile fractal dimension data of salt rocks having different lithological characters in the Table, the acoustic emission of the impure salt rock does not show fractal characteristics until the peak stress reaches 20%. This is because the number of acoustic emission events of the impure salt rock in the early stage of loading is less and not aggregated, the fractal dimension of the acoustic emission location map at the peak time of the impure salt rock is 2.1, whereas the fractal dimension of the acoustic emission location map at the peak time of the pure salt rock is 2.18. Under the adverse effect of impurities in the indirect tensile test, the fractal dimension of the impure salt rock is decreased more obviously than that of the pure salt rock.

III. Fractal Characteristics of Acoustic Emission Under Direct Tension Conditions Under direct tension conditions, the AE spatial distribution fractal dimension is respectively calculated for the pure salt rock and the impure salt rock using the column covering theory. The stress peak ratio, energy and fractal dimension $D_f$ of the salt rock test pieces calculated under direct tension conditions using Equation (6-2) and Equation (6-4) are as shown in Table 6-3. The meanings in Table 6-3 are the same as those in Table 6-1.

the peak stress close to 60%. Under the direct tension conditions, the acoustic emission fractal dimension of the pure salt rock also gradually decreases as the stress increases. The decrease of the fractal dimension indicates that the number of acoustic emission events starts to aggregate in a certain space, which indicates the occurrence of damage. Influenced by tension conditions, the stress stage when damage accumulation occurs in the salt rock test piece under the direct tension conditions is later. Under the adverse effect of the impurities, the stress stage when damage accumulation occurs in the impure salt rock test piece occurs later under the direct tension conditions.

TABLE 6-3

Fractal calculation results of acoustic emission locating points of salt rock under direct tension conditions

| Test piece number | Stress peak ratio % | Energy W ($10^{-3}$ J) | Calculated fractal dimension $D_f$ | Test piece number | Stress peak ratio % | Energy W ($10^{-3}$ J) | Calculated fractal dimension $D_f$ |
|---|---|---|---|---|---|---|---|
| ut-3 | 10 | 19.23 | — | ly-2 | 10 | 0.94 | — |
| Pure salt | 20 | 30.85 | — | Impure | 20 | 2.46 | — |
| rock | 30 | 53.24 | — | salt rock | 30 | 10.48 | — |
|  | 40 | 90.46 | 2.88 |  | 40 | 26.24 | — |
|  | 50 | 139.47 | 2.84 |  | 50 | 80.49 | — |
|  | 60 | 189.46 | 2.81 |  | 60 | 249.26 | 2.81 |
|  | 70 | 332.49 | 2.76 |  | 70 | 412.35 | 2.76 |
|  | 80 | 380.83 | 2.71 |  | 80 | 629.67 | 2.67 |
|  | 90 | 469.46 | 2.67 |  | 90 | 779.51 | 2.60 |
|  | 100 | 504.34 | 2.65 |  | 100 | 971.20 | 2.52 |

FIG. 21A, FIG. 21B, FIG. 22A and FIG. 22B respectively show the relationship between the fractal dimension and the stress peak ratio and the relationship between the fractal dimension and the energy of two salt rock test pieces under direct tension conditions, wherein the relationship between the energy and the fractal dimension of the pure salt rock test piece ut-3 and the impure salt rock test piece ly-2 is as shown in Equation (6-9).

$$\begin{cases} \text{Test piece ut-3: } D_f = 3.5962 W^{-0.048} \\ \text{Test piece ly-2: } D_f = 4.3821 W^{-0.079} \end{cases} \quad (6\text{-}9)$$

Compared with the bending tension and the indirect tension, under the direct tension conditions, the fractal characteristics of the acoustic emission locating point appear later. Under the direct tension conditions, the pure salt rock shows the fractal characteristics at the peak stress of 40%, and the impure salt rock shows the fractal characteristics at IV. Fractal Characteristics Under Alternating Tension and Compression Under an alternating tension and compression stress path, since the compression process is a low compression stress condition (10% compressive strength), although more acoustic emission signals are generated, these acoustic emission signal points are caused by internal compaction of the salt rock. At this moment, no larger compressive damage is formed, and there is no obvious aggregation of the acoustic emission locating points inside the rock sample. Therefore, no fractal characteristic is shown, throughout the alternating tension and compression stress cycle process, in the acoustic emission tempo-spatial map generated during the compression stage under the alternating tension and compression stress path.

Under the alternating tension and compression stress path, the AE spatial distribution fractal dimension is respectively calculated for the pure salt rock and the impure salt rock in the tensile damage process using the column covering theory. The stress peak ratio, energy and fractal dimension $D_f$ of the salt rock test pieces calculated under direct tension conditions using Equation (6-2) and Equation (6-4) are as shown in Table 6-4. The meanings in Table 6-4 are the same as those in Table 6-1.

TABLE 6-4

Fractal calculation results of acoustic emission locating points of salt rock under the alternating tension and compression stress path (tensile process)

| Test piece number | Stress peak ratio % | Energy W($10^{-3}$ J) | Calculated fractal dimension $D_f$ | Test piece number | Stress peak ratio % | Energy W ($10^{-3}$ J) | Calculated fractal dimension $D_f$ |
|---|---|---|---|---|---|---|---|
| UT-10 | 10 | 27.35 | — | LY-12 | 10 | 1.56 | — |
| Pure salt | 20 | 42.79 | — | Impure | 20 | 3.69 | — |
| rock | 30 | 76.37 | — | salt rock | 30 | 14.92 | — |
|  | 40 | 144.69 | — |  | 40 | 36.98 | — |
|  | 50 | 234.64 | 2.91 |  | 50 | 112.93 | — |

TABLE 6-4-continued

Fractal calculation results of acoustic emission locating points of salt rock under the alternating tension and compression stress path (tensile process)

| Test piece number | Stress peak ratio % | Energy W($10^{-3}$ J) | Calculated fractal dimension $D_f$ | Test piece number | Stress peak ratio % | Energy W ($10^{-3}$ J) | Calculated fractal dimension $D_f$ |
|---|---|---|---|---|---|---|---|
| | 60 | 300.59 | 2.87 | | 60 | 349.21 | — |
| | 70 | 448.59 | 2.75 | | 70 | 577.54 | 2.86 |
| | 80 | 567.25 | 2.69 | | 80 | 881.78 | 2.69 |
| | 90 | 745.19 | 2.63 | | 90 | 1091.56 | 2.58 |
| | 100 | 815.74 | 2.51 | | 100 | 1359.93 | 2.43 |

FIG. 23A, FIG. 23B, FIG. 24A and FIG. 24B respectively show the relationship between the fractal dimension and the stress peak ratio and the relationship between the fractal dimension and the energy of two salt rock test pieces in the alternating tension and compression test, wherein the relationship between the energy and the fractal dimension of the pure salt rock test piece UT-10 and the impure salt rock test piece LY-12 is as shown in Equation (6-10).

$$\begin{cases} \text{Test piece ut-10: } D_f = 5.2884W^{-0.108} \\ \text{Test piece LY-12: } D_f = 9.3891W^{-0.186} \end{cases} \quad (6\text{-}10)$$

Under the alternating tension and compression stress path, the acoustic emission fractal dimension of the salt rock shows a downward trend in the tensile damage process. Compared with the direct tensile loading and unloading stress path, the fractal characteristics of the acoustic emission locating point appear later. The pure salt rock shows fractal characteristics when the peak stress is 40% under the direct tensile loading and unloading stress path, whereas the pure salt rock shows fractal characteristics when the peak stress is 50% under the alternating tension and compression stress path. The impure salt rock shows fractal characteristics when the peak stress is close to 60% under the direct tensile loading and unloading conditions, whereas the impure salt rock shows fractal characteristics when the peak stress is 70% under the alternating tension and compression stress path. This indicates that the fractal characteristics of the acoustic emission locating point of salt rock appear later under the alternating tension and compression stress path.

From the point of view of the acoustic emission fractal dimension at the peak moment, the final fractal dimension under the alternating tension and compression stress path is smaller than that under the direct tensile loading and unloading stress path. This indicates that the dimension reduction process of the acoustic emission fractal dimension under the alternating tension and compression is more obvious than that under the direct tension.

In the tensile deformation damage test of the above salt rock test pieces under four different tensile conditions, conclusions may be drawn by analyzing the relationship between the stress, energy, and fractal dimension of the salt rock under the different tensile conditions.

Conclusion I: under the four tensile conditions, the acoustic emission fractal dimension of salt rock shows a dimension reduction property with increase of stress and release of energy. The dimension reduction process is related to the mechanical characteristics of salt rock. In the loading and unloading tests under the bending tension, indirect tension and direct tension, the higher the tensile strength is, the smaller the acoustic emission fractal dimension is. Under the adverse effect of impurities, the fractal dimension of the impure salt rock is smaller than that of the pure salt rock under any tensile conditions. This indicates that the internal damage of the impure salt rock is more aggregated.

Conclusion II: affected by the stress path, the fractal characteristics of the acoustic emission locating point of the salt rock appear later under the alternating tension and compression stress path, and the fractal dimension under the alternating tension and compression stress path at the peak moment becomes smaller than that under the direct tensile loading and unloading stress path. This indicates that the internal damage of salt rock is more aggregated under the alternating tension and compression stress path.

In summary, in this embodiment, based on acoustic emission signal spatial distribution information of salt rock, the AE fractal characteristics of a salt rock test piece may be obtained under different tensile conditions by using the column covering fractal research theory, and the correlational relationship between stress, energy and fractal dimension may be obtained, which may lay a basis for subsequent analysis.

Other parts of this embodiment are the same as those in the above Embodiment 7, and thus their detailed descriptions are omitted herein.

The above embodiments are merely preferred embodiments of the present invention, and are not intended to limit the present invention in any form. Any simple alterations or equivalent modifications made to the above embodiments in accordance with technical essences of the present invention shall fall within the scope of protection of the present invention.

What is claimed is:

1. A system for monitoring rock damage in a deep engineering environment, comprising an acoustic emission sensor assembly and an acoustic emission amplifier assembly; wherein
the acoustic emission sensor assembly and the acoustic emission amplifier assembly are mounted on a rock mechanics test system;
the rock mechanics test system comprises a triaxial cavity base, a triaxial cavity mounted on the triaxial cavity base, a triaxial cavity lifting oil cylinder mounted on a top of the triaxial cavity, an upright column mounted on an output end of the triaxial cavity lifting oil cylinder, and a test piece indenter arranged at the top of the triaxial cavity, and an indenter base arranged at a bottom in the triaxial cavity, between the test piece indenter and the indenter base there is space for placing a test piece, the test piece indenter is mounted on the output end of the triaxial cavity lifting oil cylinder through the upright column, and the triaxial cavity lifting oil cylinder drives the test piece indenter through the upright column to move up and down;

the acoustic emission sensor assembly comprises a plurality of acoustic emission detection heads and a clamp fixing spring; and each of the plurality of acoustic emission detection heads comprises an acoustic emission sensor and an acoustic emission sensor clamp mounted in one-to-one correspondence;

the acoustic emission sensor clamp comprises a coupling screw, a clamp cover, a clamp cylinder, and a coupling panel, and the clamp cover, the clamp cylinder and the coupling panel are threadedly connected in sequence; the clamp cover comprises a cover body provided with an internal thread, and a cover spring installed at a center of a bottom surface of an inner cavity of the cover body; two ends of a cylinder wall of the clamp cylinder are respectively provided with an external thread, and an end of the two ends of the cylinder wall is provided with an arc-shaped notch, and three cut-through coupling holes are evenly distributed on the cylinder wall along a circumferential direction, and three coupling screws pass through the three coupling holes (8-2-2) respectively to clamp the acoustic emission sensor in a radial direction of the clamp cylinder at a center of an inner cavity of the clamp cylinder; an upper surface of the coupling panel is flat and straight and is provided with a threaded through hole at a center of the upper surface, and a lower surface of the coupling panel is bent along a uniaxial direction and forms a cambered surface fitting with an outer surface of the cylinder wall of the clamp cylinder;

the triaxial cavity is further provided with two sets of the plurality of acoustic emission detection heads in positional correspondence with two ends of the test piece, one set of the two sets of the plurality of acoustic emission detection heads is composed of N acoustic emission detection heads uniformly distributed on the outer wall of the triaxial cavity along a circumferential direction and the clamp fixing spring connecting the N acoustic emission detection heads end to end to form a ring; two ends of the acoustic emission sensor are respectively connected to the clamp fixing spring extending into the acoustic emission detection heads from the arc-shaped notch, and the clamp fixing spring in a stretched state provides the acoustic emission sensor with a pressure urging the acoustic emission detection heads to stably fit with the outer wall of the triaxial cavity, wherein N is a positive integer greater than 1; and the acoustic emission amplifier assembly comprises an acoustic emission amplifier, an upright column having a guide rail, a lifting support plate, and a support plate lifting oil cylinder, wherein an output end of the support plate lifting oil cylinder mounted on the triaxial cavity base arranged transversely, two upright columns having guide rails vertically fixed to the triaxial cavity base are slidably connected to two ends of the lifting support plate, respectively, the acoustic emission amplifier connected to the acoustic emission sensor in one-to-one correspondence is mounted on the lifting support plate far away from the triaxial cavity, and the acoustic emission amplifier sends an amplified signal to the acoustic emission sensor via a signal line passing through the arc-shaped notch.

2. The system for monitoring rock damage in the deep engineering environment according to claim 1, wherein the clamp cylinder comprises an outer metal cylinder, an inner heat insulation cylinder, and a condenser pipe, between the outer metal cylinder and the inner heat insulation cylinder coaxially sleeved there is formed a condensation cavity communicating with the condenser pipe and allowing a condensate to be introduced.

3. The system for monitoring rock damage in the deep engineering environment according to claim 2, wherein a value of the N is 4, there are eight acoustic emission detection heads in the two sets, and eight acoustic emission sensors of the eight acoustic emission detection heads are separately connected to eight acoustic emission amplifiers in one-to-one correspondence.

4. The system for monitoring rock damage in the deep engineering environment according to claim 1, wherein a groove is respectively arranged at edges adjacent to a left side and a right side on the upper surface of the coupling panel, and two small-diameter circular holes are provided outside the groove.

5. The system for monitoring rock damage in the deep engineering environment according to claim 4, wherein a value of the N is 4, there are eight acoustic emission detection heads in the two sets, and eight acoustic emission sensors of the eight acoustic emission detection heads are separately connected to eight acoustic emission amplifiers in one-to-one correspondence.

6. The system for monitoring rock damage in the deep engineering environment according to claim 1, wherein the two ends of the acoustic emission sensor are respectively provided with a small hole allowing a connector of the clamp fixing spring to pass through; two adjacent acoustic emission sensors are directly connected through one clamp fixing spring, or two adjacent acoustic emission sensors are connected through a plurality of clamp fixing springs (7) connected in series.

7. The system for monitoring rock damage in the deep engineering environment according to claim 6, wherein a value of the N is 4, there are eight acoustic emission detection heads in the two sets, and eight acoustic emission sensors of the eight acoustic emission detection heads are separately connected to eight acoustic emission amplifiers in one-to-one correspondence.

8. The system for monitoring rock damage in the deep engineering environment according to claim 1, wherein an upper end of the upright column having the guide rail is provided with a linear guide rail, and two ends of the lifting support plate are respectively mounted with a pulley embedded into the linear guide rail and linearly slidable along the linear guide rail.

9. The system for monitoring rock damage in the deep engineering environment according to claim 8, wherein a value of the N is 4, there are eight acoustic emission detection heads in the two sets, and eight acoustic emission sensors of the eight acoustic emission detection heads are separately connected to eight acoustic emission amplifiers in one-to-one correspondence.

10. The system for monitoring rock damage in the deep engineering environment according to claim 1, wherein a value of the N is 4, there are eight acoustic emission detection heads in the two sets, and eight acoustic emission sensors of the eight acoustic emission detection heads are separately connected to eight acoustic emission amplifiers in one-to-one correspondence.

11. An evaluation method based on acoustic emission tempo-spatial evolution laws, comprising:
analyzing, by a rock mechanics test system mounted with a system for monitoring rock damage in a deep engineering environment, an AE fractal characteristic of an acoustic emission tempo-spatial evolution process in a whole process of tensile deformation damage of a salt rock;

calculating a fractal dimension of acoustic emission spatial distribution using a column covering method to obtain an AE characteristic relationship curve associated with an acoustic emission locating point; and analyzing a relationship between stress, energy and fractal dimension in different tensile conditions based on an energy variation in the whole process of the tensile deformation damage.

12. The evaluation method based on the acoustic emission tempo-spatial evolution laws according to claim 11, wherein the AE characteristic relationship curve comprises a curve of relationship between stress, ring count and time; a curve of relationship between stress, accumulated ring count and time; a curve of relationship between stress, energy rate and time; and a curve of relationship between stress, accumulated energy and time.

13. The evaluation method based on the acoustic emission tempo-spatial evolution laws according to claim 11, wherein the different tensile conditions refer to a three-point bending tension, an indirect tension, a direct tension, and an alternating tension and compression.

* * * * *